United States Patent
Naganuma et al.

(10) Patent No.: US 9,864,660 B2
(45) Date of Patent: Jan. 9, 2018

(54) BACKUP MANAGEMENT SYSTEM AND BACKUP MANAGEMENT METHOD

(71) Applicant: HITACHI, LTD., Tokyo (JP)

(72) Inventors: Yuki Naganuma, Tokyo (JP); Yuichi Taguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 14/535,711

(22) Filed: Nov. 7, 2014

(65) Prior Publication Data
US 2015/0134717 A1    May 14, 2015

(30) Foreign Application Priority Data

Nov. 8, 2013   (JP) ................................ 2013-321782

(51) Int. Cl.
   *G06F 11/14*    (2006.01)
   *H04L 29/08*    (2006.01)
(52) U.S. Cl.
   CPC ...... *G06F 11/1464* (2013.01); *H04L 67/1002* (2013.01); *H04L 67/1095* (2013.01); *H04L 67/18* (2013.01)
(58) Field of Classification Search
   None
   See application file for complete search history.

(56) References Cited

U.S. PATENT DOCUMENTS

| | | | |
|---|---|---|---|
| 8,528,085 B1 * | 9/2013 | Juels .................. | G06F 21/80 726/22 |
| 8,688,650 B2 * | 4/2014 | Mutalik ............ | G06F 17/30162 707/690 |
| 9,069,482 B1 * | 6/2015 | Chopra ................... | G06F 3/065 |

(Continued)

FOREIGN PATENT DOCUMENTS

| JP | 2005-4243 A | 1/2005 |
|---|---|---|
| JP | 2008-519319 A | 5/2008 |

(Continued)

OTHER PUBLICATIONS

Zmanda—A Carbonite Company, "Amanda Enterprise—Open Source Backup Software", AE datasheet v10, Amanda Enterprise Datasheet, 2010, http://www.zmanda.com/pdf/amanda-enterprise-datasheet.pdf.

(Continued)

*Primary Examiner* — Ninos Donabed
(74) *Attorney, Agent, or Firm* — Mattingly & Malur, PC

(57) ABSTRACT

The backup management system includes a storage device that retains a location management table that stores therein at least one of position specifying information uniquely specifying a location provided by a computer resource in each cloud service and an area specifying information specifying a predetermined area including the location provided without uniquely specifying the location provided, and a processing device configured to perform a process of receiving a designation related to a computer resource as a backup target and a backup requirement, from a user of the cloud service, and a process of specifying as a backup destination a computer resource that has a position relation with the computer resource as the backup target satisfying the backup requirement, based on a designation from the user and at least one of the position specifying information and the area specifying information.

9 Claims, 23 Drawing Sheets

(56) References Cited

U.S. PATENT DOCUMENTS

| | | | |
|---|---|---|---|
| 9,141,628 B1* | 9/2015 | Zimmermann | G06F 17/30106 |
| 2010/0076856 A1* | 3/2010 | Mullins | G06Q 30/08 |
| | | | 705/26.1 |
| 2010/0131324 A1* | 5/2010 | Ferris | G06Q 10/0631 |
| | | | 705/7.12 |
| 2010/0131590 A1* | 5/2010 | Coleman | G06F 9/5044 |
| | | | 709/203 |
| 2010/0131592 A1* | 5/2010 | Zhang | G06F 9/5044 |
| | | | 709/203 |
| 2010/0241731 A1 | 9/2010 | Du et al. | |
| 2010/0250748 A1* | 9/2010 | Sivasubramanian | G06F 9/5016 |
| | | | 709/226 |
| 2010/0274762 A1* | 10/2010 | Murphy | G06F 11/1446 |
| | | | 707/636 |
| 2010/0274765 A1* | 10/2010 | Murphy | G06F 11/1451 |
| | | | 707/652 |
| 2010/0274983 A1* | 10/2010 | Murphy | G06F 11/1456 |
| | | | 711/162 |
| 2010/0318759 A1* | 12/2010 | Hamilton | G06F 11/1451 |
| | | | 711/171 |
| 2011/0004574 A1* | 1/2011 | Jeong | G06N 5/02 |
| | | | 706/12 |
| 2011/0004916 A1* | 1/2011 | Schiffman | G06F 9/5011 |
| | | | 726/1 |
| 2011/0055712 A1* | 3/2011 | Tung | G06F 9/5072 |
| | | | 715/738 |
| 2011/0313874 A1* | 12/2011 | Hardie | H04W 4/02 |
| | | | 705/26.1 |
| 2012/0041783 A1* | 2/2012 | McKee | G06F 19/322 |
| | | | 705/3 |
| 2012/0102103 A1* | 4/2012 | Jacobson | G06F 9/5072 |
| | | | 709/204 |
| 2012/0136936 A1* | 5/2012 | Quintuna | G06F 21/604 |
| | | | 709/204 |
| 2012/0226808 A1* | 9/2012 | Morgan | G06F 9/5072 |
| | | | 709/226 |
| 2012/0304191 A1* | 11/2012 | Morgan | G06F 9/5088 |
| | | | 718/105 |
| 2012/0311280 A1* | 12/2012 | Schmidt | G06F 11/1469 |
| | | | 711/162 |
| 2013/0173553 A1* | 7/2013 | Apte | G06F 7/00 |
| | | | 707/640 |
| 2013/0304904 A1* | 11/2013 | Mouline | H04L 43/045 |
| | | | 709/224 |
| 2014/0172929 A1* | 6/2014 | Sedayao | G06F 17/30212 |
| | | | 707/827 |
| 2014/0244791 A1* | 8/2014 | Fellows | H04L 67/06 |
| | | | 709/217 |

FOREIGN PATENT DOCUMENTS

| | | |
|---|---|---|
| JP | 2011-197939 A | 10/2011 |
| WO | 2005/060201 A1 | 6/2005 |

OTHER PUBLICATIONS

Japanese Office Action received in corresponding Japanese Application No. 2013-231782 dated May 23, 2017.

* cited by examiner

| 121 | 121A | 121B | 121C | 121D |
|---|---|---|---|---|
| | CLOUD NAME | DCID | DISCLOSED LOCATION | NON-DISCLOSED LOCATION |
| | CLOUD A | DC1 | GPS(TOKYO_AREA) | GPS(DC1_ADDRESS) |
| | | DC2 | GPS(OSAKA_AREA) | GPS(DC2_ADDRESS) |
| | CLOUD B | DC3 | GPS(OSAKA_AREA) | GPS(DC2_ADDRESS) |
| | CLOUD C | DC4 | GPS(OKINAWA_AREA) | GPS(DC3_ADDRESS) |
| | ... | ... | ... | ... |
| | CLOUD D | DC5 | GPS(OSAKA_AREA) | —(UNKNOWN) |
| | | DC6 | GPS(TOKYO_AREA) | —(UNKNOWN) |
| | CLOUD E | DC7 | GPS(US_AREA) | —(UNKNOWN) |
| | ... | ... | ... | ... |

FIG. 5

| 122 | | | |
|---|---|---|---|
| CLOUD NAME (122A) | SERVICE ID (122B) | TARGET DC (122C) | USAGE FEE (122D) |
| CLOUD A | SERVICE_A1 | DC1 | $1 / (GB·DAY) |
| | SERVICE_A2 | DC2 | $2 / (GB·DAY) |
| CLOUD B | SERVICE_B1 | DC3 | $1 / (GB·DAY) |
| ... | ... | ... | ... |
| CLOUD D | SERVICE_D1 | DC5 | $1 / (GB·DAY) |
| CLOUD E | SERVICE_E1 | DC6 | $0.1 / (GB·DAY) |
| | SERVICE_E2 | DC7 | $0.05 / (GB·DAY) |
| ... | ... | ... | ... |

FIG. 6

| 123 | NWID | CONNECTION 123A | 123B | LINE TYPE 123C | COMMUNICATION SPEED 123D | COMMUNICATION QUALITY 123E | USAGE FEE 123F |
|---|---|---|---|---|---|---|---|
| | NW 0 | DC1 | DC1 | INTERNAL LAN | 10 GBps | ASSURED | $0/GB |
| | NW 1 | DC1 | DC2 | INTERNET | 100 MBps | VOLATILE | $1/GB |
| | NW 2 | DC1 | DC3 | DEDICATED LINE | 1 GBps | ASSURED | $0.1/GB |
| | NW 3 | DC1 | DC4 | INTERNET | 100 MBps | VOLATILE | $1/GB |
| | NW 4 | DC1 | DC4 | DEDICATED LINE | 100 MBps | ASSURED | $1/GB |
| | ... | ... | ... | ... | ... | ... | ... |
| | NWx | DC1 | DC5 | INTERNET | 100 MBps | VOLATILE | $1/GB |
| | NWy | DC1 | DC6 | INTERNET | 10 MBps | VOLATILE | $1/GB |
| | NWz | DC1 | DC7 | INTERNET | 5 MBps | VOLATILE | $4/GB |
| | ... | ... | ... | ... | ... | ... | ... |

FIG. 7

| RESOURCE ID | CLOUD NAME | SERVICE ID | USER ID | SIZE |
|---|---|---|---|---|
| VOL1 | CLOUD A | SERVICE_A1 | GUEST1 | 10GB |
| VOL2 | CLOUD B | SERVICE_B1 | GUEST1 | 20GB |
| VOL3 | CLOUD D | SERVICE_D1 | GUEST2 | 10GB |
| VOL4 | CLOUD E | SERVICE_E1 | GUEST3 | 20GB |
| ... | | | | ... |

FIG. 9

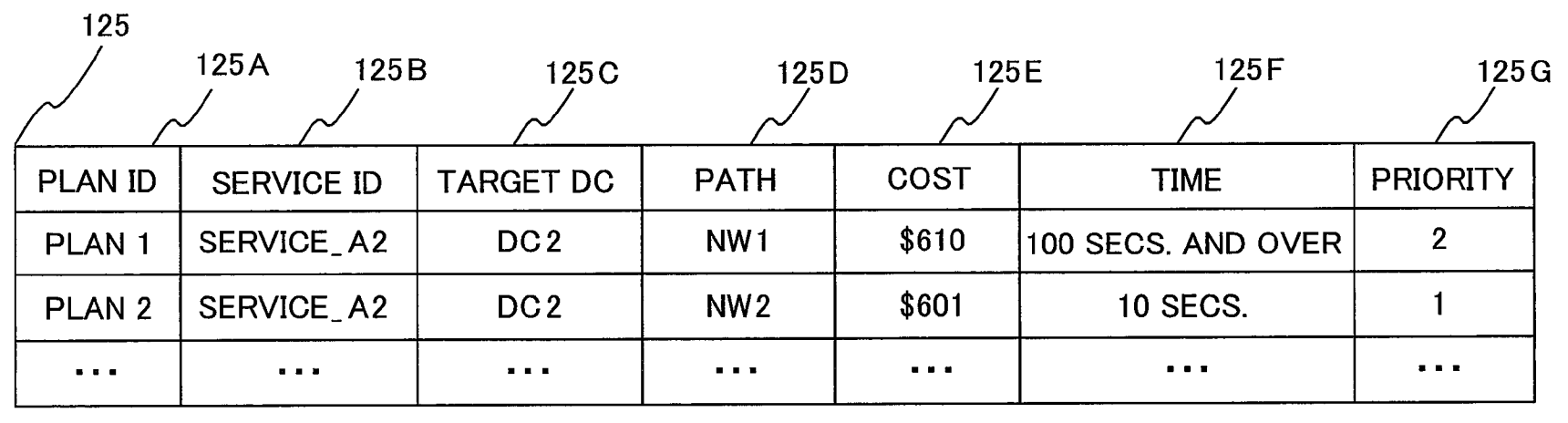

| PLAN ID | SERVICE ID | TARGET DC | PATH | COST | TIME | PRIORITY |
|---|---|---|---|---|---|---|
| PLAN 1 | SERVICE_A2 | DC2 | NW1 | $610 | 100 SECS. AND OVER | 2 |
| PLAN 2 | SERVICE_A2 | DC2 | NW2 | $601 | 10 SECS. | 1 |
| ... | ... | ... | ... | ... | ... | ... |

| BACKUP SOURCE RESOURCE ID | TARGET RESOURCE ID | STATE | TYPE |
|---|---|---|---|
| VOL1 | VOL5 | IN PROGRESS | FULL BACKUP (DR) |
| VOL3 | VOL6 | EXECUTED | DIFFERENCE BACKUP |
| ... | ... | ... | ... |

| CLOUD NAME | DCID | VIEWPOINT | | | | |
|---|---|---|---|---|---|---|
| | | SECURITY | AVAILABILITY | RELIABILITY | COST | BACKUP TIME |
| CLOUD A | DC1 | 1.0 | 0.9 | 0.9 | — | — |
| CLOUD B | DC2 | 1.0 | 0.9 | 0.8 | — | — |
| CLOUD C | DC3 | 0.7 | 0.7 | 0.7 | — | — |
| | DC4 | 0.6 | 0.6 | 0.7 | — | — |
| ... | ... | ... | ... | ... | ... | ... |
| CLOUD D | DC5 | 0.7 | 0.7 | 0.7 | — | — |
| CLOUD E | [DC6,DC7] | 0.8 | 0.5 | 0.5 | — | — |
| ... | ... | ... | ... | ... | ... | ... |

FIG. 17

BACKUP MANAGEMENT SYSTEM AND BACKUP MANAGEMENT METHOD

CROSS-REFERENCE TO RELATED APPLICATION

The present application claims the benefit of priority pursuant to 35 U.S.C. §119(a) to Japanese Patent Application No. 2013-231782, filed on Nov. 8, 2013, the entire disclosure of which is hereby incorporated herein by reference.

BACKGROUND

1. Technical Field

Embodiments of this disclosure generally relate to a backup management system and a backup management method, and more particularly to a technology for enabling a backup according to the cloud user's requirements without disclosing to the cloud user non-disclosed information of a cloud operator.

2. Related Art

Services that enable use of computer resources based on a network, particularly the Internet, called cloud services (hereinafter, "cloud") are becoming widespread recently. A cloud user is allowed to access via the network a computer resource of a single or a plurality of clouds provided in the above manner to use the provided services.

As an example of use, there is a case where backup of data from a particular cloud to a different cloud is made. And to deal with such circumstances, there has been proposed a technology of, for example, mounting (corresponding) a storage area provided by the cloud to a storage area of the service user's terminal, and performing a data backup (copying) between two clouds using a copy function and the like performed by an Operating System (OS) (US-2010/0241731).

Among Open Source Software (OSS) and commercially available software, software other than the above have become available for allowing backup between clouds over the Internet.

As mentioned above, a cloud user can perform data backup between clouds using conventional technology. Meanwhile it is common for the cloud operator that provides the cloud to strictly limit the range of internal management information to be disclosed to the service user being an outsider in order to avoid various operational risks. For such reason, even if there were a demand for a cloud user to perform a specific backup based on such internal management information, it would be difficult to be carried out in the current situation where internal management information cannot be freely used.

As internal management information of the cloud operator that is not disclosed to the outsider, there is, for example, the position information of the data center (hereinafter, "DC") where the computer resources physically exist. And the cloud user in this case would be performing backup operations without correctly holding the DC position so that a problem where both the backup source data and the backup destination data physically exist in the same DC may easily occur. When a DC failure occurs under this circumstance, data in both the backup source and backup destination cannot be accessed resulting in reducing the availability.

It is therefore an objective of the present invention to provide a technology that allows backup that meets the requirements of the cloud user without disclosing to the cloud user non-disclosed information of the cloud operator.

SUMMARY

Disclosed embodiments describe a backup management system that includes a storage device that retains a location management table that stores therein at least one of position specifying information uniquely specifying a location provided by a computer resource in each cloud service and an area specifying information specifying a predetermined area including the location provided without uniquely specifying the location provided, and a processing device configured to perform a process of receiving through a communication device or an input device a designation related to a computer resource as a backup target and a backup requirement, from a user of the cloud service, and a process of specifying as a backup destination a computer resource that has a position relation with the computer resource as the backup target satisfying the backup requirement, based on a designation from the user and at least one of the position specifying information and the area specifying information of the each computer resource stored in the location management table.

Further, disclosed embodiments relate to a backup management method including a computer having a storage device that retains a location management table that stores therein at least one of position specifying information uniquely specifying a location provided by a computer resource in each cloud service and an area specifying information specifying a predetermined area including the location provided without uniquely specifying the location provided, including a process of receiving through a communication device or an input device a designation related to a computer resource as a backup target and a backup requirement, from a user of the cloud service, and a process of specifying as a backup destination a computer resource that has a position relation with the computer resource as the backup target satisfying the backup requirement, based on a designation from the user and at least one of the position specifying information and the area specifying information of the each computer resource stored in the location management table.

Other problems disclosed in the present application and the means for solving such problems will become clear from the description in the detailed description of the invention and the drawings attached.

According to the present invention, backup that meets the requirements of the cloud user without disclosing to the cloud user non-disclosed information of the cloud operator is possible.

BRIEF DESCRIPTION OF THE DRAWINGS

For a more complete understanding of the present invention and the advantages thereof, reference is now made to the following description taken in conjunction with the accompanying drawings wherein:

FIG. 5 is a diagram illustrating an example of a data configuration of the cloud data center management table in the first embodiment;

FIG. 6 is a diagram illustrating a data configuration example of a service management table in the first embodiment;

FIG. 7 is a diagram illustrating a data configuration example of a network management table in the first embodiment;

FIG. 9 is a diagram illustrating a data configuration example of a backup candidate table in the first embodiment;

FIG. 10 is a diagram illustrating a data configuration example of a backup management table in the first embodiment;

FIG. 17 is a diagram illustrating a data configuration example of a cloud evaluation table in the second embodiment;

DETAILED DESCRIPTION

Figure 1:
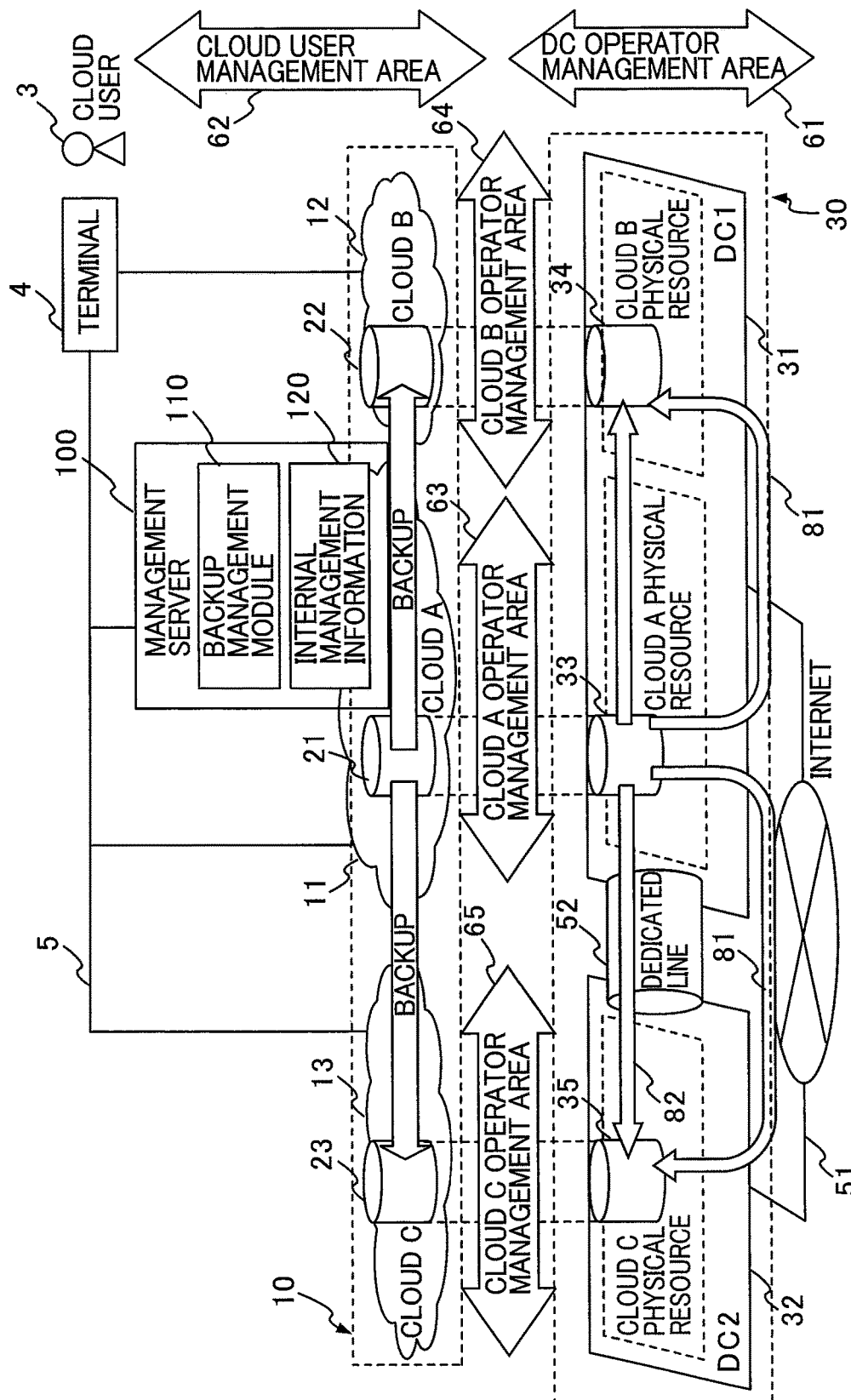
FIG. 1 is a network configuration diagram including the backup management system of the first embodiment.

Description of the embodiments according to the present invention will be given in the following with reference to the drawings. FIG. 1 illustrates a network configuration diagram including the management server 100 (hereinafter, "management server") being the backup management system in the first embodiment. The management server 100 shown in FIG. 1 is a computer apparatus that enables backup according to the cloud user's requirements without disclosing to the cloud user non-disclosed information of a cloud operator.

The relation between the management server 100 and the cloud (cloud service) as the target managed by the management server 100 will be described together with the network configuration. Note that, description of the network configuration in the first embodiment will be given, however, the description is to apply to the other embodiments in the same manner unless described otherwise.

The clouds 11 to 13 being the target of management by the management server 100 are services provided to the cloud user 3 via the terminal 4 coupled by the network 5, and are provided by the cloud operator. Each of the virtual computer resources (hereinafter, "virtual resources") 21, 22, 23 provided by these clouds 11 to 13 physically exist, in other words are implemented, in the data centers (DCs) 31, 32. The DCs 31, 32 are managed by the DC operator. Hereby, the cloud operators and the DC operators work together in conjunction to provide the clouds 11 to 13. Note that in the following description, the clouds 11 to 13 are collectively called the clouds 10, the virtual resources 21, 22, 23 the virtual resources 20, and the DCs 31, 32 the DCs 30.

Meanwhile, the cloud user 3 connects the terminal 4 to the clouds 11 to 13 through the network 5 and uses the virtual resources 21 to 23 provided by the clouds as mentioned above. Such configuration and utilization form of the cloud is the same as those already available.

In the exemplified configuration, the area in which information is reached by each of the cloud user 3, the cloud operator and the DC operator are as shown in FIG. 1. Specifically, area 61 around each DC is reached by the DC operators, areas 63 to 65 around each cloud are reached by the respective cloud operator providing the cloud, and area 62 around the computer resource in the cloud is reached by the cloud user 3 using the cloud. In other words, the areas that can be reached by each of the cloud user 3, the DC operator and the cloud operator are different.

Here, there is a case where, for example, a cloud operator does not disclose information on such as the DC location to the cloud user 3 for security reasons and the like. And there is a case where the DC operator does not have the corresponding relation between the cloud user 3 and the computer resources for reasons such as client information protection.

And in such circumstances, the cloud user 3, for instance, backs up data of the virtual resource 21 on the cloud 11 (cloud A in FIG. 1) to the virtual resource 22 of the cloud 12 (cloud B in FIG. 1) as, for example, a measure against disaster (disaster recovery, hereinafter "DR"). But as mentioned above, the cloud user 3 would be performing a backup from the physical resource 33 to the physical resource 34 of the same DC 31 with the above backup operation since the cloud user 3 does not have information on the DCs 30. If the DC 31 were to be damaged, there is a risk that both the physical resource 33 and the physical resource 34 in the DC 31 will suffer some kind of loss and the stored data would be lost. Same as the cloud user 3, even the cloud operator of the cloud 11 not being able to have internal management information relating to the cloud operator of the cloud 12 cannot realize using the physical resources of the same DC 31 and thus cannot inhibit the aforementioned backup process in the same DC. Additionally, the DC operator not knowing the intentions of the cloud user is also unable to inhibit the aforementioned backup process.

In order to avoid such circumstances, backup management and control is performed using this internal management information 120 while maintaining the division between areas 61 and 62, and 63 to 65 in which different information can be reached by the above users and operators, and retaining information on the physical configuration of such as DCs 30 and information of the virtual resources 20 on the clouds 10 as internal management information 120, in the management server 100. Details on the information retained by the management server 100 will be described later.

With the management server 100 above having a configuration illustrated in FIG. 1 of performing backup management with the clouds 10 as the management target, when the cloud user 3 instructs a backup to the management server 100, the management server 100 uses the internal management information 120 to determine the suitability of the backup destination and notifies the backup destination to the cloud user 3, performs the actual backup process according thereto, and the like. Note that, when the management server 100 retains information (later described network management table 123) relating to network topology being information of coupling between DCs, backup that could only be performed via the Internet 51 (path 81) would be able to be performed via, for example, a dedicated line 52 (path 82).

The aforementioned configuration and function allows the cloud user 3 to perform a backup matching the backup requirements (backup objective and specification, cost, backup time etc.) desired by the cloud user 3. Meanwhile, the cloud operator will be able to provide high-value-added services, compared to conventional ones, relating to the backup function to the cloud user 3 by using the backup management function provided by the management server 100.

First Embodiment

Figure 2:
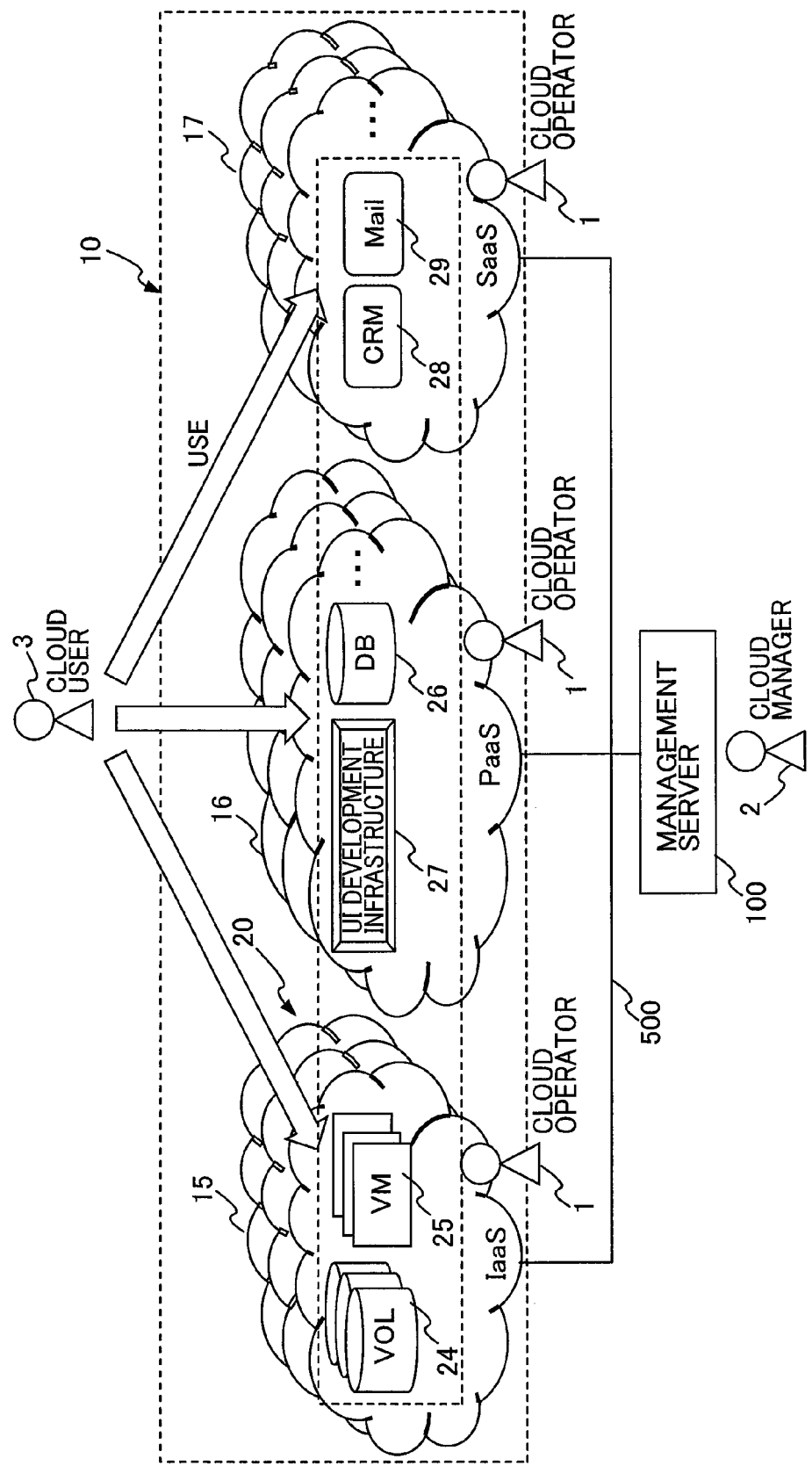
FIG. 2 is a diagram illustrating the concept of cloud management in the backup management system in the first embodiment.

In the following, description of the first embodiment of the present invention will be given. Note that, all the embodiments are given for the purpose of showing examples of the characteristics of the present invention and are not intended to limit the present invention. FIG. 2 is a diagram that illustrates the concept of cloud management performed by the management server 100 in the first embodiment and specifically, illustrates the cloud 10 being the management target of the management server 100 and the characters relating thereto. For example, the Infrastructure as a Service (IaaS) 15 that provides virtual resources 20 such as the storage area 240 and the virtual server (hereinafter, "VM") 25, the Platform as a Service (PaaS) 16 that provides computer resources such as the DB 26 and the User Interface (UI) development infrastructure 27, and the Software as a Service (SaaS) 17 that provides computer resources (applications) such as the Customer Relationship Management (CRM) 28 and the Mail 29 can be given as examples of the cloud 10 shown in FIG. 2.

A single cloud operator 1 provides one or more of such clouds 10. The cloud manager 2 manages the clouds using the management server 100 (or the terminal 4 coupled to the management server 100) that manages the one or more of the clouds 10 provided in the above manner. As an example of cloud management, there is such as allocating a computer resource to the cloud user 3 that directly uses computer resources.

The cloud manager 2 may serve as a cloud user 3 or a cloud operator 1, an Information Technology (IT) manager of a company and the like or a Cloud Service Broker (CSB) that exclusively performs management of a plurality of clouds and the like.

The backup as the management target of the management server 100 in the first embodiment may be performed between the IaaSs 15 of different cloud operators or between different cloud types such as the PaaS 16 and the SaaS 17 that do not depend on the difference of the cloud operators 1.

Figure 3:
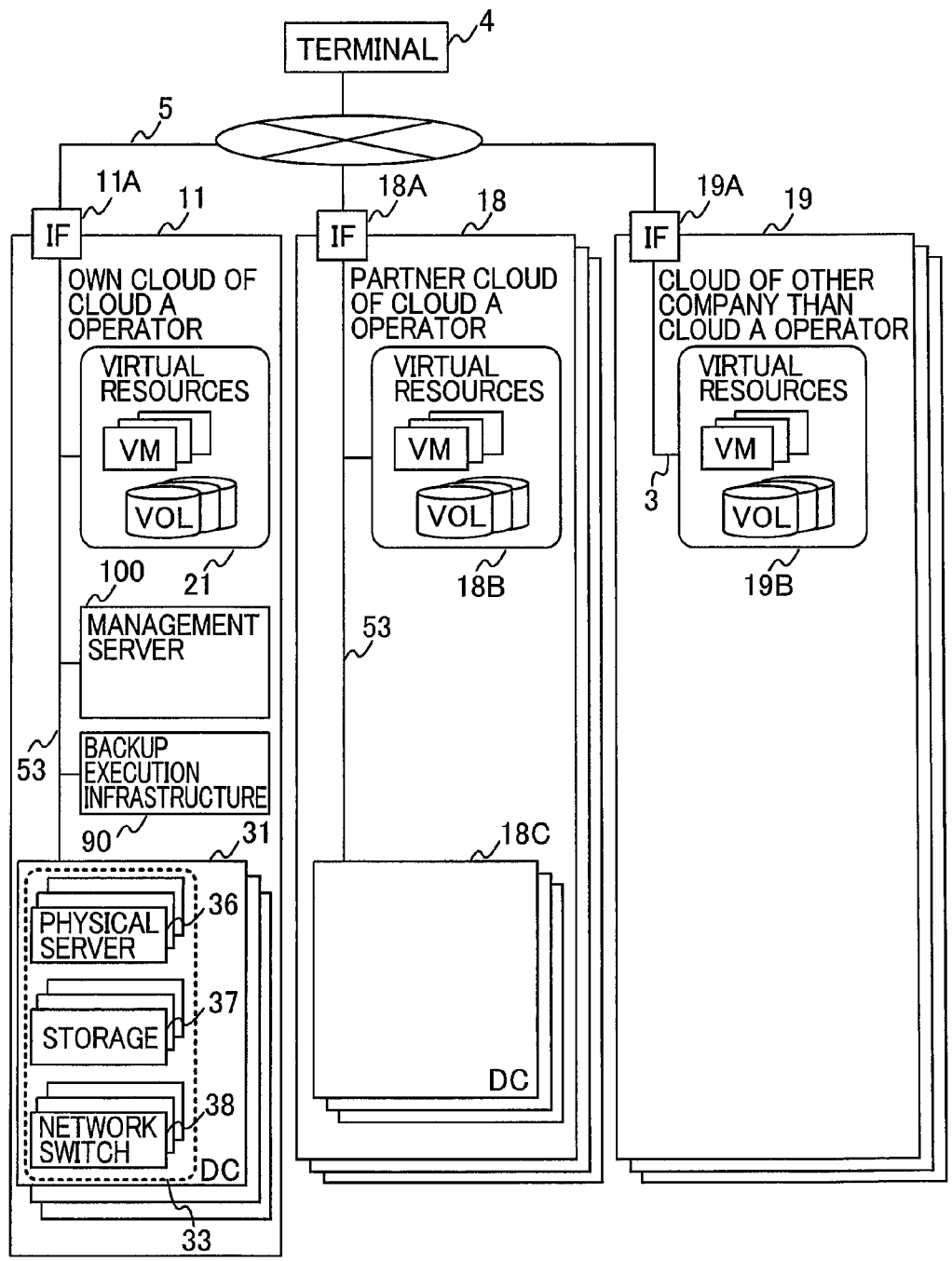
FIG. 3 is an overall configuration diagram illustrating a management target cloud assumed in the first embodiment.

FIG. 3 is an overall configuration diagram of the management target cloud assumed in the first embodiment. Here, each of the clouds include a virtual resource 20 to be provided to the cloud user 3 and interfaces (hereinafter, "IF") 11A, 18A, 19A for accessing to the virtual resources 20 from outside. An Application Programming Interface (API) can be assumed as an example of the IF. Further, all the clouds are assumed to be operated by the same cloud operator.

The cloud user 3 uses the terminal 4 to access to the IFs of each cloud via the network 5 and utilizes the virtual resources 20 provided by the each cloud. And a plurality of line types such as the Internet and a VPN circuit or a dedicated line can be introduced as the network 5.

Meanwhile, from the viewpoint of the cloud operator that provides the cloud 11 (cloud A) illustrated in FIG. 3, the provided cloud, in addition to its own cloud 11, also includes a partner cloud 18 that is in a partnership relation and is enabled to have a part or all of the non-disclosed information relating the relevant cloud, and a different company cloud 19 that can obtain only disclosed information relating to the relevant cloud. And among these, the inside of the cloud 11 is configured with the virtual resources 20 provided to the cloud user 3, and one or more DCs 31 including the physical resource 33 (the physical server 36, the storage 37 and the network switch 38) for providing the virtual resources 20, being coupled by an internal network 53. Note that, the cloud 11 can be configured to include the management server 100 and the backup execution infrastructure 90.

And from the viewpoint of the cloud operator of the cloud 11, the information of the partner cloud 18 and the other company cloud 19 are only disclosed information that can be reached through IF 18A, 19A. But there may be a case where the partner cloud 18 retains information that is not disclosed to the public (for example, location information of DC 18C) depending on the contract.

The management server 100 accesses to the virtual resources 21, 18B, 19B in the clouds and the DCs 31, 18C that configure the physical resource through the IFs 11A, 18A, 19A and the like of each cloud. And the management server 100 can access the resources without passing through IF 11A when the management server 100 exists in the cloud 11.

The following description describes the management server 100 to be of a type provided by the cloud operator of the cloud 11 for the sake of convenience but the management server 100 may be provided in other ways. In other words, the management server 100 may operate in the physical server or the VM inside the cloud or may operate outside the cloud. But when the cloud operates outside the cloud, a technology for, for example, encrypting of communication and storage data and the like will be separately applied so that the later described internal management information 120 is kept from leaking.

Additionally, the backup execution infrastructure 90 uses information relating to the backup source (backup target) and the backup destination, the backup path, and the backup method (difference backup, full backup or the like described later) that are input and executes backup processes (that is, data transfer processes) performed through specified paths from the backup source to the backup destination. The backup process may be of a type where changes in the settings (e.g., switching etc. in the network switch 38) inside the cloud for performing a backup through a specified path, and which is a method and the like performed through the Internet 51 which, for example, has been explained in the passage on the Related Art.

In the following description, backup is to be performed only once at a certain time. But the backup can be applied to a configuration where data is permanently transferred (hereinafter, "continuous backup").

The backup execution infrastructure 90 may be of a type, other than the above, that exists inside the cloud other than cloud 11, inside the management server 100 or outside the cloud, and uses cloud control by the IF (IF 11A and IF 18A, 19A etc.) of the cloud.

Further, the backup execution infrastructure 90 is not an essential element when the process performed by the management server 100 is such as proposing a backup destination or determining the adequacy of the backup destination where backup is not performed.

Figure 4:
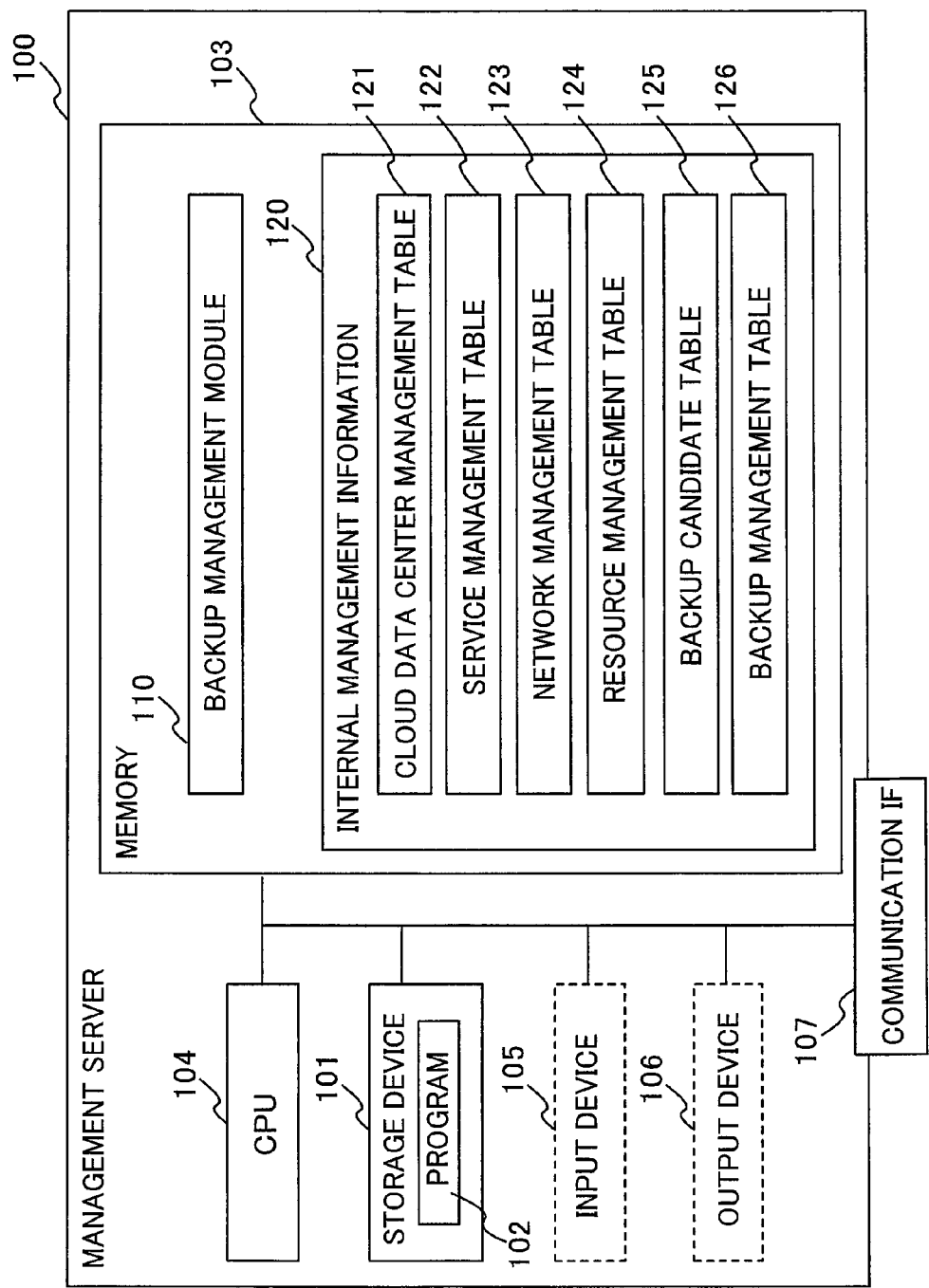
FIG. 4 is a diagram illustrating an example of a management server configuration constituting the backup management system of the first embodiment.

Subsequently, description of the hardware configuration of the management server 100 will be given. FIG. 4 is a diagram illustrating an example of a management server 100 configuration constituting the backup management system of the first embodiment. The management server 100 includes a storage device 101 configured with a non-volatile storage device that stores various programs 102 such as the Operating System (OS), a memory 103 configured with a volatile storage device such as a RAM, a CPU 104 (processing device) that performs centralized control of the storage device 101 itself by reading to the memory 103 and executing the program 102 retained in the storage device 101 as well as performs various decisions, calculations and control processings, and a communication IF 107 (communication device) for communicating with the outside through the network.

The above memory 103 has stored therein a backup management module 110 that performs backup management and various tables 121 to 126 as internal management information 120. The backup management module 110 and the internal management information 120 are stored in the storage device 101 and are used by the CPU 104 that reads to the memory 103 from the storage device 101 when executing a predetermined processing. Further, the backup management module 110 is a function unit implemented by the CPU 104 reading and executing programs 102 retained in the storage device 101.

Note that, the details of the processing in the backup management module 110 and the tables 121 to 126 of the internal management information 120 will be described later. A configuration may be employed where the management server 100 obtains all or a part of the information corresponding to the tables 121 to 126 from each cloud through the IF 11A and the like, in response to the processing in the backup management module 110, to be retained in the memory 103.

Further, the configuration may include an input device 1025 that receives key input or voice input from the cloud user 3 when the cloud user 3 is made to directly operate the management server 100 and not through the terminal 4, and an output device 1026 that displays processing data.

Next, description on a data configuration example will be given of the aforementioned tables 121 to 126 retained by the management server 100. FIG. 5 is a diagram illustrating an example of a data configuration of the cloud data center management table 121 in the first embodiment. The cloud data center management table 121 is a table that manages information relating to DCs of the clouds. This cloud data center management table 121 corresponds to the location management table in the present invention.

The cloud data center management table 121 exemplified in FIG. 5 retains values of the cloud name 121A being the identifier of the cloud, DCID 121B being the identifier of the DC retained by the cloud, disclosed location 121C indicating the location of the DC generally disclosed to the public through the Web site and the like of the cloud operator, and the location information 121D, not disclosed to the public, of the DC of the company's cloud or the DC obtained according to a partner contract.

The non-disclosed location 121D has listed therein the value of the location when the location is known since the DC is of its own or known according to a partner contract, or "-(Unknown)" when the location is unknown since being a cloud of another company and the like.

The DCID 121B is used as an identifier that uniquely identifies a DC with the DCID 121B alone in the following. The DCID 121B may be an identifier that uniquely identifies a DC together with the cloud name 121A but in this case, information that the clouds differ although the DC is the same needs to be clearly indicated. Further, with regard to the location, when the DC is designated although the non-disclosed location 121D is unknown, a different DCID in such unit may be used. For example, when the Availability Zone (AZ) of the Amazon Web Service (AWS) and others that do not have the DCs themselves disclosed but has provided a logical unit that are guaranteed to be placed apart, may have the DCID set in each unit.

The data format of the disclosed location 121C and the non-disclosed location 121D is, for example, the coordinate information or area data in the Global Positioning System (GPS). The following description will be given on the assumption that the information in this GPS is used, however, other formats, for example, a normalized address (e.g., "xx, yy-City, zz-Prefecture, Japan") may be used. Additionally, when the non-disclosed location 121D is not "-(Unknown)", the disclosed location 121C need not be an essential element.

Note that in the following, description will be given assuming that in the example of table 121 of FIG. 5, the "cloud A" is the cloud of its own company, "cloud B" and "cloud C" are partner clouds and "cloud D" and "cloud E" are clouds of other companies.

FIG. 6 is a diagram illustrating a data configuration example of a service management table 122 in the first embodiment. This service management table 122 is a table that manages services for the cloud user 3 under contract for using the virtual resources 20 of the clouds 10, and corresponds to the cost information table in the present invention.

The service management table 122 includes values of the cloud name 122A that provides the services, the service ID 122B for identifying the service provided by the cloud, target DC 122C that is to be the DC to which the virtual resource is created when the service ID 122B is designated, and usage fee 122D of the service.

The service ID 122B is an identifier for uniquely identifying the service by itself or together with the cloud name 122A. And the target DC 122C is described for the case where a single service ID corresponds to a single DC for simplicity in the following description, however, a configuration where the service ID 122B corresponds to multiple DCs may be employed. Further, the service ID 122B may be in units smaller than the service ID indicated to a general cloud user 3. This is because there are cases where the cloud operator internal management divides the service IDs in more detail even though the services are shown to be simple to the general cloud user 3 to avoid confusion. Furthermore, the usage fee 122D indicates the fee for using the service. It is common for the cloud 10 to perform accounting by charging on an as-used basis, in other words, charging according to the amount and term the virtual resources 20 were used, and the value of the usage fee 122D uses values of the format that accords with such. Units are normalized and stored in the table 122 when the accounting units differ (e.g., monthly fee and hourly fee) according to the clouds 10. Even furthermore, a value in units of pieces, in other words a value corresponding to the type in which the usage fee is billed only when conclusion of contract, besides charge on an as-used basis may be stored.

FIG. 7 is a diagram illustrating a data configuration example of the network management table 123 in the first embodiment, and to be specific, is a table that retains therein information relating to communication relations among the clouds 10 or the DCs 30, used for backup. This network management table 123 corresponds to the cost information table and the communication quality information table in the present invention.

This network management table 123 includes values of the NWID 123A being an identifier for identifying the network, the connection 123B indicating the DCs 30 of the connection destination and connection source, the line type 123C indicating the connection type, the communication speed 123D between the DCs, the communication quality 123E indicating whether the communication speed 123D is of a band assured line or of a best effort type line presenting the maximum value, and the usage fee 123F for the communication.

Generally, clouds that are not in alliance are usually coupled only over the internet (e.g., NWx to NWz of NWID 123A). Meanwhile there are cases where connections between DCs of its own company cloud or between a DC of a partner cloud and a DC of its own company cloud, are supported by laying high quality dedicated lines (e.g., NW2 and NW4 of NWID 123A) and the like in addition to the connection over the Internet. Further, there are cases where the presences of such dedicated lines are not disclosed by the cloud operator 1 to the public.

The communication quality 123E indicates that the use of the value of the communication speed 123D is permanently assured in the corresponding line when the value indicates "ASSURED". On the other hand, when the value indicates "VOLATILE", this indicates that the actual use speed is not assured although the maximum value of the communication value takes the value of the communication speed 123D in the corresponding line. Further, with regard to the usage fee 123F, it is common for the cloud 10 to perform accounting by charging on an as-used basis, in other words, charging according to the amount the virtual resources 20 were used. The following description will be given based on this type, however, charging in units of pieces can be employed. Further, values are appropriately normalized and retained when the accounting units differ. Note that although the network management table 123 assumes an undirected graph, a directed graph, in other words, a case where the line speed from, for example, DC1 to DC2 and DC2 to DC1 differ may be assumed.

Figure 8:
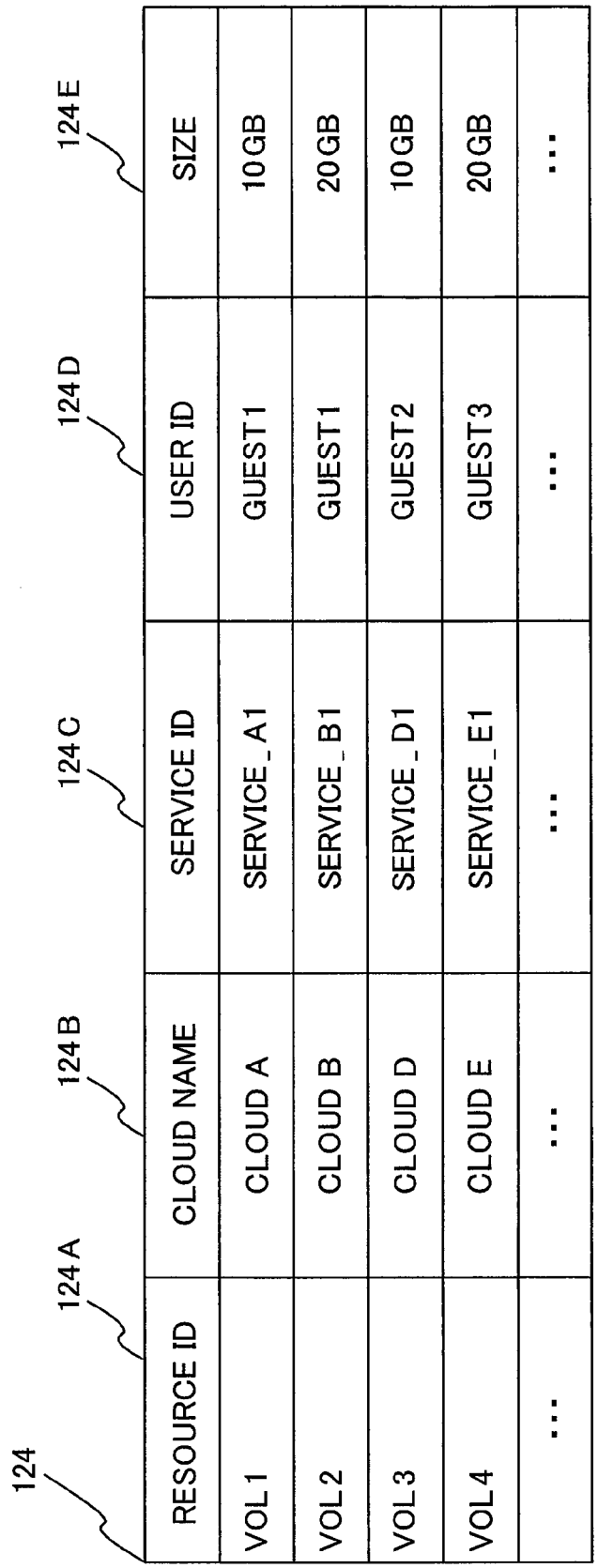
FIG. 8 is a diagram illustrating a data configuration example of a resource management table in the first embodiment.

FIG. 8 is a diagram illustrating a data configuration example of a resource management table 124 in the first embodiment. The resource management table 124 is a table that manages the virtual resources 20, existing on the clouds 10, used by the cloud user 3. This resource management table 124 includes values of the resource ID 124 being an identifier of the virtual resources 20, the cloud name 124B of the corresponding cloud, the service ID 124C being an identifier of the service under contract when using the pertinent virtual resource, the user ID 124D indicating the owner (cloud user 3) of the pertinent virtual resources 20, and the size (capacity) 124E of the pertinent virtual resources 20.

The service ID 122C is one of the values indicated in the service management table 122 of FIG. 6. Additionally, DCID 121B can be used instead of service ID 122C. Further in the following, although the value of the size 124E is dealt as the upper limit value of the data size that can be used as the storage region by the cloud user 3, besides this, the size of the actual data used by the cloud user 3 in the applicable virtual resources 20 may be listed together with the value of the size 124E or as the size 124E.

FIG. 9 is a diagram illustrating a data configuration example of a backup candidate table 125 in the first embodiment. The backup candidate table 125 is table that retains therein information relating to backup destination candidates used in the internal processes of the backup management module 110. This backup candidate table 125 includes values of the plan ID 125A being the identifier of the candidate, the service ID 125B indicating the service using the applicable candidate as the backup destination, the target DC 125C indicating the DCs 30 used when the applicable backup destination is chosen (but may be omitted since the service ID 125B is retained), the path 125D indicating the line used during backup, the cost 125E indicating the cost estimate value when backup is performed using the applicable plan ID, the time 125F indicating the estimated value of time required for backup, and the priority value 125G indicating the advisability of the applicable plan to be used. The restore time (restoring from the backup destination to the backup source) may be considered for the time 125F being the estimated value of time required for backup. Note that, explanation on generation of the backup candidate table 125 will be given together with the process flow of the backup management module 110.

FIG. 10 is a diagram illustrating a data configuration example of a backup management table 126 in the first embodiment. The backup management table 126 is a table that retains therein information relating to backup processes performed by the backup management module 110 of the management server 100. The backup management table 126 retains values of such as the backup source resource ID 126A indicating the virtual resource 20 that is to be the backup source, the backup destination resource 126B indicating the virtual resource 20 that is to be the backup destination, the state 126C indicating the backup execution state, and the type 126D indicating the backup type (full backup etc.). The backup management table 126 may retain information relating to the backup progress degree other than the above. Explanation of the generation of the backup management table 126 will be given together with the process flow of the backup management module 110.

Figure 11:
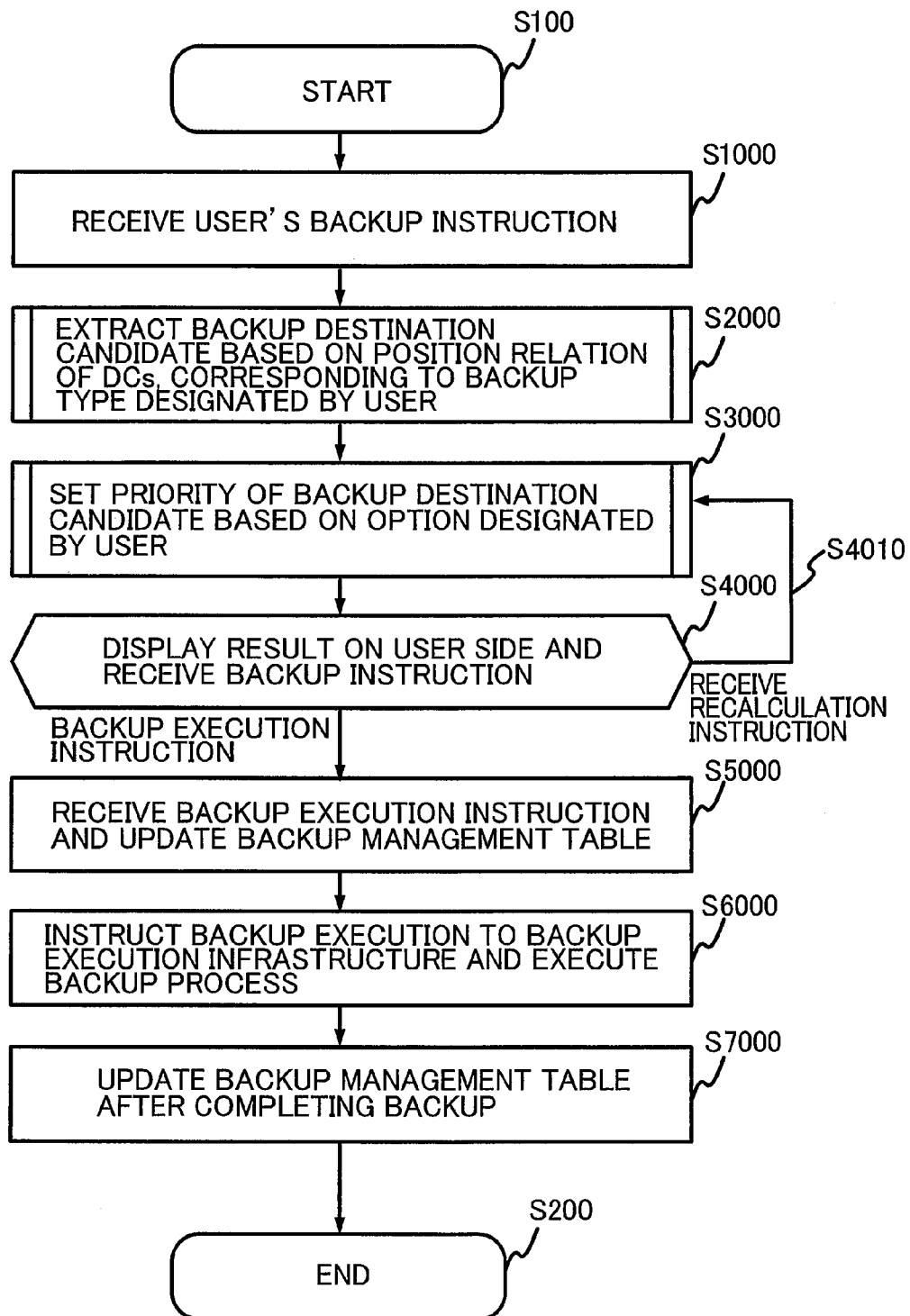
FIG. 11 is a diagram illustrating a first process flow example of the backup management method in the first embodiment.

Description of the actual procedures of the backup management method in the first embodiment will be given in the following with reference to the figures. Various operations corresponding to the backup management method in the following description are implemented by the management server 100 being the backup management system reading the programs 102 to the memory 103 and executing the program 102. This program is composed of codes for performing various operations that are explained in the following. FIG. 11 is a diagram illustrating the process flow example of the backup management method in the present embodiment. The overall process performed by the backup management module 110 in the management server 100 will be explained here.

The backup management module 110 receives a request from the cloud manager 2 or the cloud user 3 (hereinafter, collectively called "user") from the input device 105 or the terminal 4 (S100) and provides a predetermined input interface (hereinafter, "IF") at the output device 106 or the terminal 4 to receive a user input (S1000). Note that an example of the Graphical User Interface (GUI) of the input IF provided by the backup management module 110 is as illustrated in FIG. 14.

Figure 12:
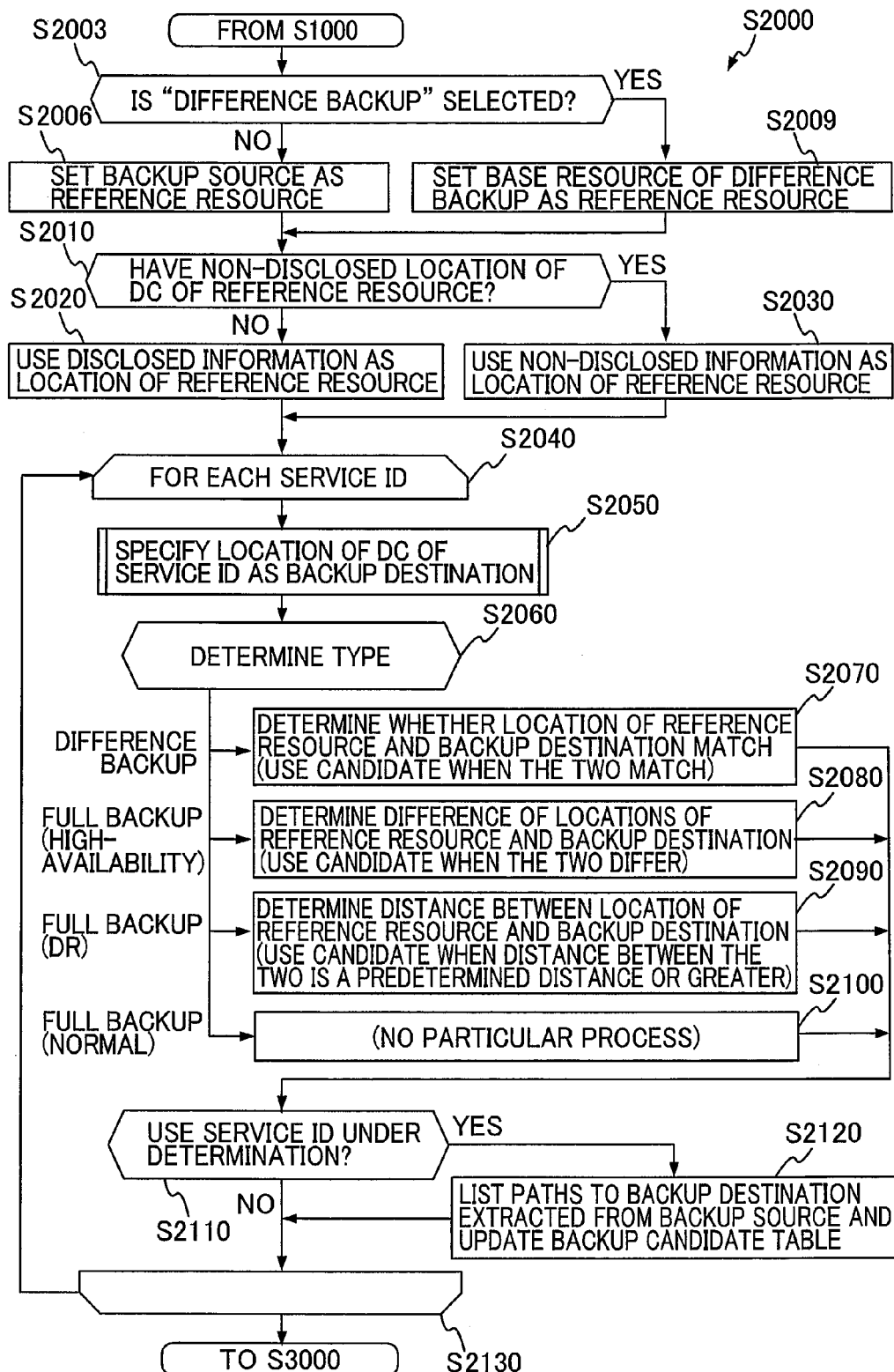
FIG. 12 is a diagram illustrating a second process flow example of the backup management method in the first embodiment.
Figure 13:
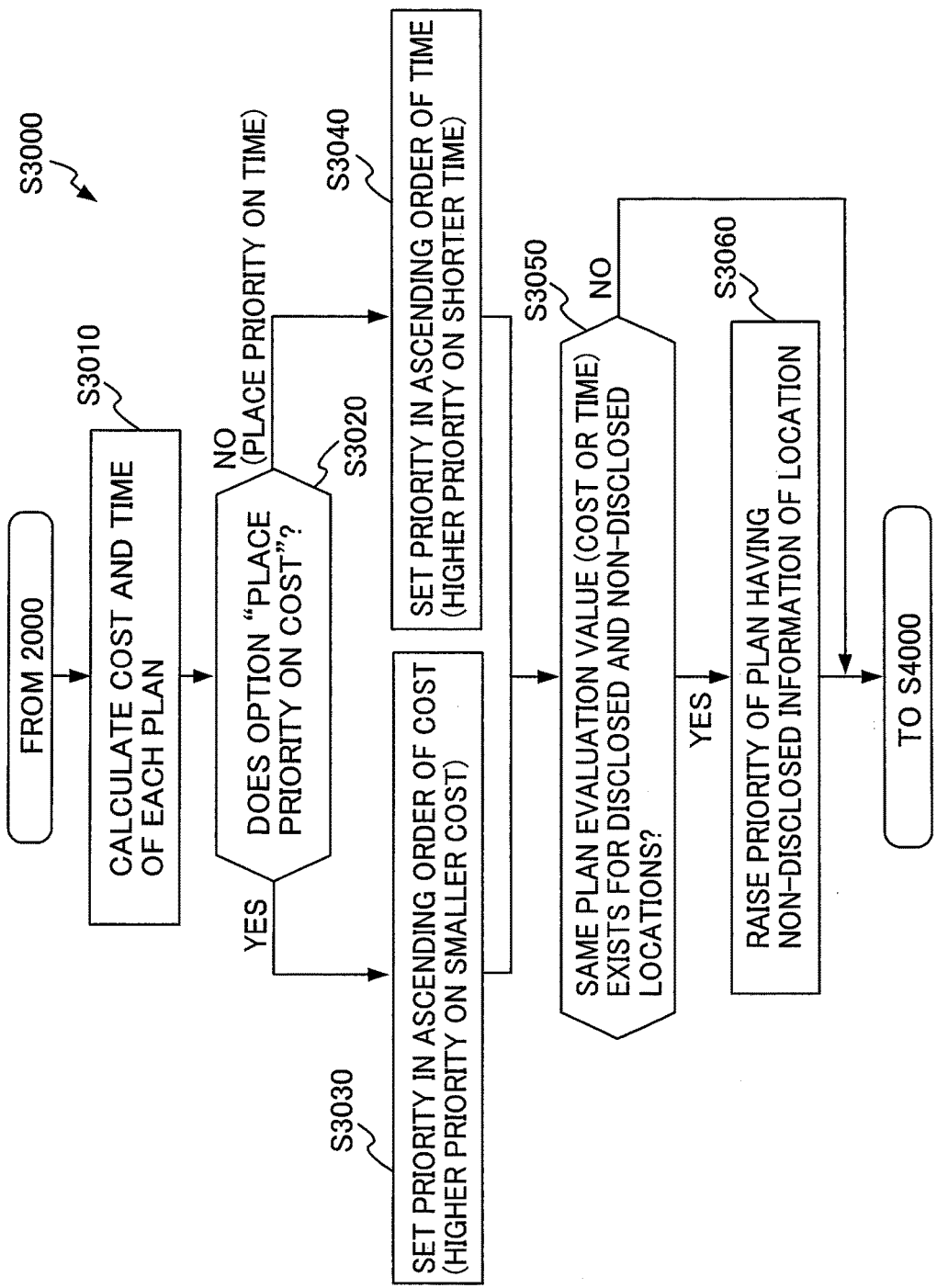
FIG. 13 is a diagram illustrating a third process flow example of the backup management method in the first embodiment.
Figure 14:
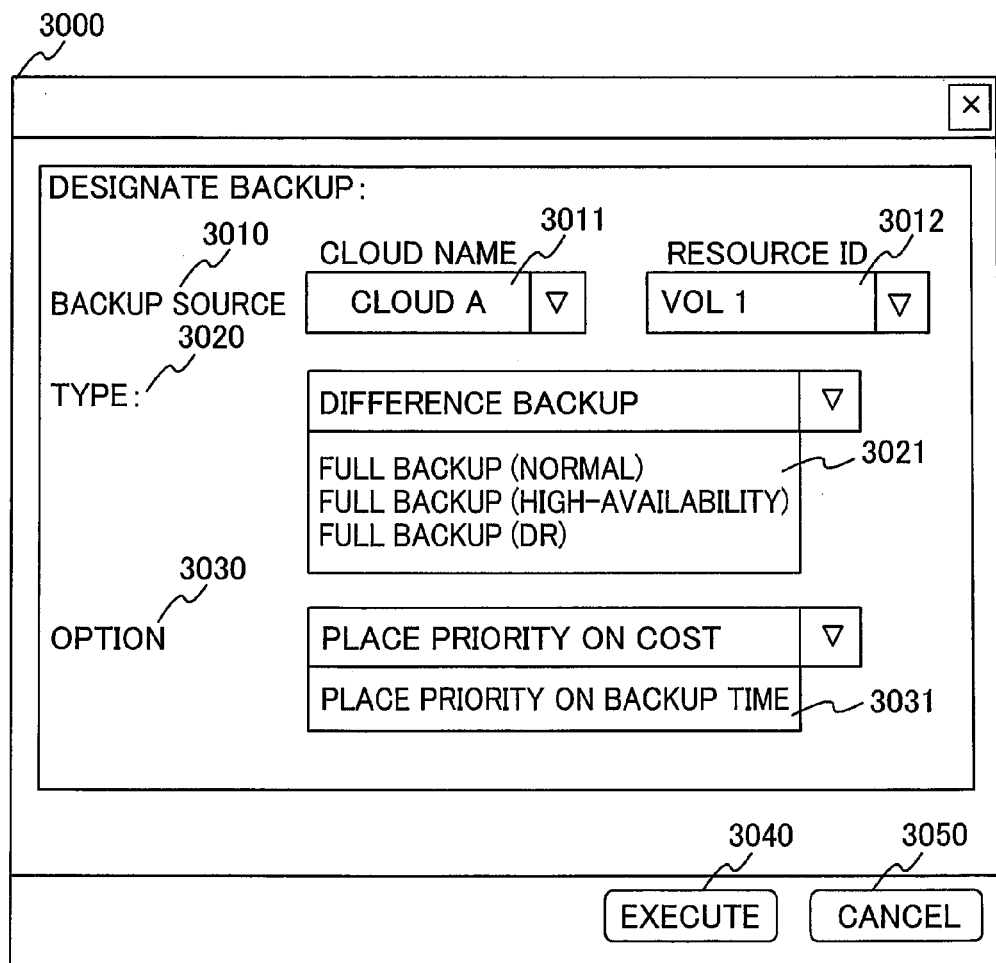
FIG. 14 is a diagram illustrating an example of an input GUI in the first embodiment.

As exemplified in FIG. 14, the GUI 3000 is, for example, composed of each fields of the cloud name 3011 that receives the information 3010 relating to the backup source, and the applicable resource ID 3012, the pull-down menu 3021 that receives the information 3020 of the backup type, and the pull-down menu 3031 that receives the option 3030 being the viewpoint that the user desires to place priority on. Additionally, when the user completes the input operation at the input device 105 and the terminal 4 and presses the execute button 3040 on the GUI 3000, the backup management module 110 that has received the event of the pressing executes the above processes of S2000 and those that follow. Whereas, the backup management module 110 terminates the process that follow when receiving an event of the cancel button 3050 being pressed. The meaning and process of each input are as indicated in FIGS. 11 to 13.

The backup management module 110 obtains the input items input through this GUI 3000, that is, the backup source information 3010, the backup type information 3020, the option information 3030 and the backup instruction (corresponding to the pressing of the execute button 3040). Note that, needless to say, the backup instruction accompanies the user ID of the user requesting the backup that has been obtained at S100.

As also exemplified in the pull-down menu 3021 in FIG. 14, four types, specifically, "full backup (normal)", "full backup (high-availability)", "full backup (DR)" and "difference backup" can be assumed as the backup type information 3020 input at the aforementioned input IF, that is, the GUI 3000 by the user. A full backup (normal) is a backup type where the entire data of the backup source is copied and a copy of the backup source at a certain time is made at the backup destination. The full backup (high-availability) is a backup type where the entire data is similarly copied but requests for a higher failure resistance than the full backup (normal). And the full backup (DR) is a backup type where data is backed up to a location where the backup destination can be used even when the backup source has been damaged by an earthquake or the like.

The difference backup is a backup type where only the difference, of the target data in the virtual resources 20 designated as the backup source, from a certain time is backed up. In this type, data of a certain time (hereinafter, "reference data") that becomes the source is required when data is to be recovered from the backup destination to the backup source after a backup. This reference data corresponds to the aforementioned data at the time of the full backup. There is a method using an archive bit, provided by an OS or the like, indicating that the data has been changed from a certain time as a method of the difference backup, but other methods can be used.

In the following, description is given such that the backup management module 110 can conform to the aforementioned four backup types, however, it is a matter of course that the backup management module 110 can be configured to conform to other backup types. When the "difference backup" is selected by the user in the pull-down menu 3021, the backup management module 110 can change the contents and processes displayed on the GUI 3000 to receive input of information on reference resource that retains the aforementioned reference data, instead of the backup source information 3010.

As the option information 3030 to be input by the user at the GUI 3000, there can be assumed for example "place priority on cost" that places priority on the cost for the backup process to be inexpensive, "place priority on time" that places priority on the time required for backup to be short, and the like, as exemplified the pull-down menu 3031 in FIG. 14. Others such as "place priority on restore time" (the process is the same with that when placing priority on backup time) that places priority on the time required for restoring data from the backup destination after a backup, may be assumed.

Next, the backup management module 110 extracts the backup destination candidate from the clouds 10 and the services managed by the management server 100, corresponding to the backup type designated by the user in above S1000, based on the position relation of the DCs (between the backup source and the backup destination) (S2000). Details of this process S2000 will be described later. The backup management module 110 initializes this backup candidate table 125 when the backup candidate table 125 to be processed at S2000 already exists in the memory 103 before the process of S2000.

Further, the backup management module 110 calculates the cost incurred and the time required for the backup for each backup destination candidate extracted at the aforementioned S2000, and executes a predetermined evaluation process on the basis of the calculation result and the details of the options designated by the user input to set the priorities of the backup destination candidates based on the evaluation result (S3000). Details of the processes of S3000 will be described later. It is a matter of course that the process for setting priority in the S3000 can be omitted when the number of backup destination candidates obtained at the above S2000 process is one.

Evaluation processes taking into consideration such as each path between all the virtual resources 20 (that become the backup destination candidates) provided to the cloud user 3 by the service and the backup source will be performed for all service IDs stored in the service management table 122 when S3000 is executed before above S2000, resulting with an enormous amount of calculation for the evaluation processes if there is a large number of clouds 10 that are the target of management by the management server 100. Therefore, it is desirable to perform the evaluation process by S3000 after the backup destination candidates are extracted, that is, narrowed down based on the position relation between the DCs by the above S2000, making the process efficient.

Subsequently, the backup management module 110 displays on the output device 106 or the terminal 4 using the output IF of the GUI, the results obtained in the above manner, that is, information of the backup destination candidate to which priority has been set, and receives the final selected backup destination and the backup execution instruction from the user (S4000). A specific example of the GUI displayed on the output device 106 or the terminal 4 in S4000 is as illustrated in FIG. 15.

Figure 15:
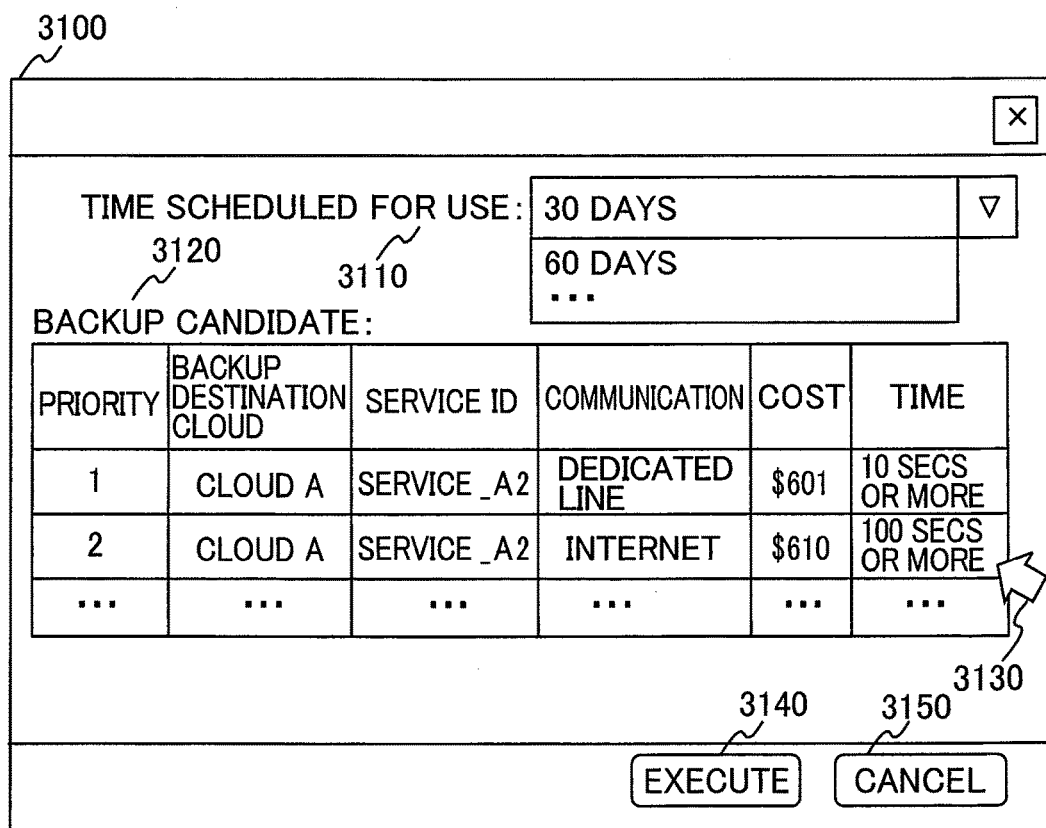
FIG. 15 is a diagram illustrating an example of an output GUI in the first embodiment.

FIG. 15 is a diagram illustrating an example of an output GUI in the first embodiment. In above S4000, the GUI image 3100 displayed to the user includes, for example, the table 3120 that displays the backup candidate table 125 having the backup candidates sorted in order of priority 125G, the input unit 3110 that receives input of the time scheduled for use being the backup time assumed by the user, the execute button 3140 that is for proceeding to the next step, and the cancel button 3150 that terminates the process. The user selects one backup candidate from the selections in the table 3120 with, for example, the cursor 3130 in the GUI 3100 and instructs to start the subsequent process S4000 by pressing the execute button 3140. When the input at the input unit 3110 is changed, in other words, when the time scheduled for use is revised, the backup management module 110 executes the later described S4010 and performs a process of recalculating the cost and the like and resetting the priority in S3000.

The backup management module 110 may be configured to not only output the values of the backup candidate table 125 but also disable the display of the value of such as the target DC or path 125D that are internal information or abstract such value and then display, as the table 3120. Additionally, the backup management module 110 may be configured to convert with a predetermined algorithm the service ID in the table 3120 to display to the user, when the service ID of the internal management information and the service ID seen by the user differ. Further, the backup management module 110 may be configured to display information such as line type 123C in the aforementioned table 3120. Note that the backup management module 110 can be configured to initialize the backup candidate table 125 when the cancel button 3150 is pressed in the GUI 3100. Further, the backup management module 110 may be configured to display a predetermined alarm notification at the output device 106 or the terminal 4 when the execution button 3140 is pressed in a state where none of the plans are selected in the table 3120.

As indicated in the usage fee 122D in the service management table 122 in FIG. 6, it is common to apply accounting by charging on an as-used basis as the accounting system for use of the clouds 10, and here the charged amount, that is, the cost increases and decreases according to the time the clouds 10 are used. Thus the backup management module 110 can be configured to receive through the input device 105 or the terminal 4 a user designation on the assumed use time required for backup and a user instruction on the recalculation process of cost and the like according to this assumed use time when the backup destination candidate is displayed at S4000 (S4010). The backup management module 110 that has received this instruction re-executes S3000 based on the above assumed use time.

Next, the backup management module 110 uses the backup destination information selected by the user at the above process of S4000 and updates the backup management table 126 (S5000). In other words, the backup management module 110 adds to the backup management table 126 such as the backup source of the selection selected by the user to the backup source resource ID 126A, the selected backup destination to the backup destination resource ID 126B and "in progress" in the state 126C.

Subsequently, the backup management module 110 instructs, to execute a backup process from the backup source to the backup destination, to the backup execution infrastructure 90 based on the user input details in the aforementioned S4000 (S6000). The backup management module 110 may abandon or initialize the backup candidate table 122 created in above S2000 during this process. Note that the backup management module 110 may be made to automatically select a backup destination candidate with the highest priority, that is, having the largest value in the priority 125G that has become apparent from the above process S3000, and automatically execute the process for backup to the selected backup destination (S5000).

Finally, the backup management module 110 monitors the backup execution state by such as periodically monitoring the backup execution infrastructure 90 and appropriately updates by changing the value of the state 126C to "executed" in the backup management table 126 relating to the corresponding backup upon completion of the backup execution (S7000). And at this time, the backup management module 110 may display, on the output device 106 or the terminal 4, the GUI that displays each of the corresponding backup execution state and the corresponding relationship between the backup source and the backup destination to provide information to the user.

Figure 16:
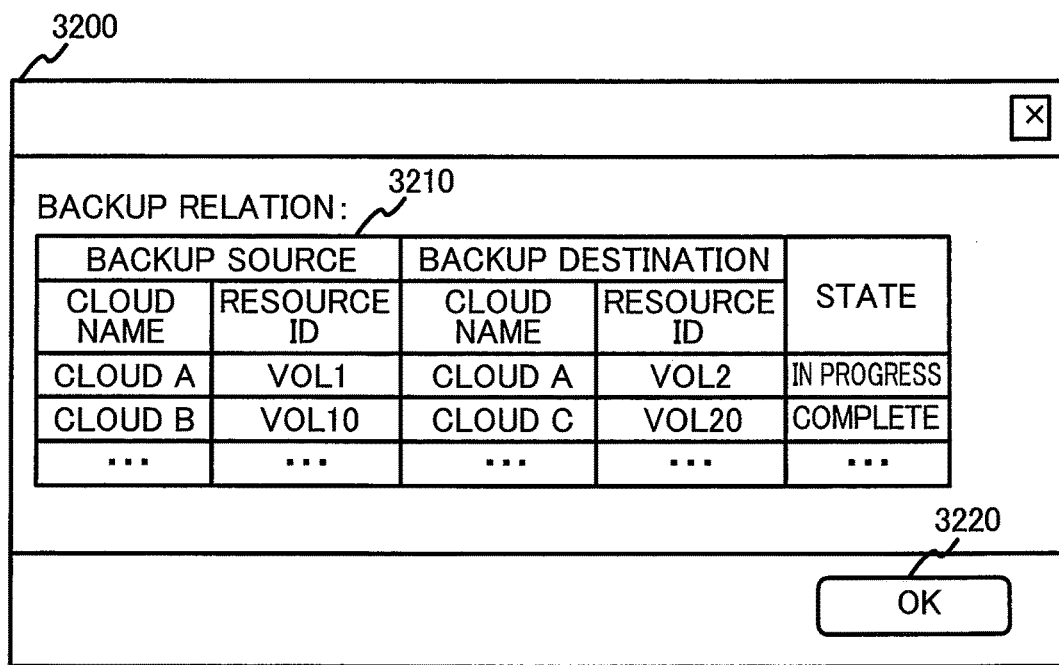
FIG. 16 is a diagram illustrating an example of a GUI used to display a backup state in the first embodiment.

FIG. 16 exemplifies the image 3200 of the GUI that displays a specific example of the above GUI, that is, the backup relation. The GUI image 3200 exemplified in FIG. 16 includes such as the table 3210 that indicates the information corresponding to the backup management table 126 and an OK button 3220 for the user to close the screen after confirming the details.

Among these, the records in the table 3210 includes the cloud names and the resource ID information of the backup source and the backup destination that have completed backup so far or those that are being backed up at the moment, and information of the backup execution state. Note that, only the backup relation that is the process target (that is, the cloud names and the resource ID information of the backup source and the backup destination,) may be displayed during the backup management process by the backup management module 110. Additionally, the backup management module 110 may be configured to display, according to the records in the table 3210, information of the backup progress degree of the backup that is being performed when the backup progress degree is being monitored.

In addition to the above, the backup management module 110 may be configured to acquire information (e.g., the ratio of data that has completed transfer among entire data that is to be transferred from the backup source to the backup destination in a backup) of the backup progress degree during the aforementioned monitoring from the backup execution infrastructure 90, and update the value of the state 126C in the corresponding record in the backup management table 126. Note that, the backup execution infrastructure 90 may be configured to notify the backup execution state to the backup management module 110 by pushing.

The backup management module 110 executes the above processes and ends the flow (S200).

Detailed description of the process S2000 in the flow shown in FIG. 11 will be given next. FIG. 12 is a diagram illustrating the second process flow example of the backup management method in the first embodiment. The backup management module 110 in this case firstly determines the reference resource that is made the reference for determining where the backup destination is to be located by whether the backup type information 3020 (see FIG. 14) that has been designated by the user at S1000 in the flow illustrated in FIG. 11 is a "difference backup" (S2003).

In the above process of S2003, when the backup type specified by the user is a type other than "difference backup" (S2003: NO), the backup management module 110 temporarily stores, in such as the memory 103, as the reference resource information values of the cloud name 3011 and the resource ID 3012 that has been specified by the user as the backup source in the above GUI (S2006).

On the other hand, when the backup type specified by the user is "difference backup" (S2003: YES), the backup management module 110 temporarily stores in such as the memory 103 as the above reference information base resource information (including names of the applicable cloud that provides the base resource) of the difference backup (S2009). This base resource is the resource that has stored therein base data that is the starting point of the difference, and can receive designation from the user through the input device 105 or the terminal 4, or can extract and obtain the applicable information when defined in the backup management table 126 in advance.

An alarm or the like to the user is displayed on the output device 106 or the terminal when there is no designation by the user or there can be found no information in the backup management table 126, that is, when the base resource cannot be specified (difference does not exist). And process S2006 is performed even when the backup type is difference backup if the backup source is the base resource due to the user type (e.g., continuous backup and the like) and the like.

Subsequently in S2010, the backup management module 110 uses as the key the set of values of the cloud name 3011 and the resource ID 3012 included in the above reference resource information temporarily stored in the memory 103 and the like, and searches the resource management table 124 to acquire the service ID 124C value from the corresponding record searched. Additionally, the backup management module 110 searches the service management table 122 using the values of the acquired service ID 124C and the above cloud name 3011 to acquire the ID of the target DC 122C from the searched corresponding record. This target DC 122C is in other words the DC that provides the above reference resource. In other words, the backup management module 110 will be specifying the DC in which the data of the backup source is physically stored by this process S2010. And when the IDs of a plurality of the target DCs 122C are correlated to the service ID in the service management table 122, the backup management module 110 acquires values of the plurality of the target DCs 122C.

Next, the backup management module 110 searches the cloud data center management table 121 using the ID of the DC specified in above S2010 and the value of the cloud name 3011 obtained at GUI 3000 to acquire the DC location information from the searched corresponding records.

When the value of the non-disclosed location 121D among the information of the corresponding DCs acquired from the cloud data center management table 121 is "-(Unknown)" (S2010: NO), the backup management module 110 recognizes that the non-disclosed location is unknown and specifies the location of the DC corresponding to the reference resource as the value of the disclosed location 121C and temporarily stores the value in the memory 103 and the like (S2020).

On the other hand, when the value of the non-disclosed location 121D acquired above is other than "-(Unknown)", in other words, when the information of the non-disclosed location was specified (S2010: YES), the backup management module 110 recognizes that the non-disclosed location was found and specifies the location of the DC corresponding to the reference resource as the value of the non-disclosed location 121D and temporarily stores the value in the memory 103 and the like (S2030).

Note that, when a plurality of target DC 122C values is acquired at above S2010, the backup management module 110 handles as the corresponding value, the area data that takes the logical sum of the each of the places of the plurality of target DCs as the value of the disclosed location or the non-disclosed location in the processes of S2020 and S2030.

Subsequently, the backup management module 110 evaluates as the backup destination the DCs that are made the reference resources in above S2020 and S2030 by successively performing processes of the following S2050 to S2120 for each target DC 122C indicated by each record (i.e., each service) listed in the service management table 122, and extracts the backup destination candidates (S2040 to S2130).

In S2050 among the above processes, the backup management module 110 selects as the process target the record at, for example, the top row in the service management table 122 and acquires values of the cloud name 122A and the target DC 122C included in the record of the process target. Additionally, the backup management module 110 uses the acquired values of the cloud name 122A and the target DC 122C as the keys to perform a search in the cloud data center management table 121 and acquires location information (values of disclosed location 121C and non-disclosed location 121D) of the corresponding DC that is enabled to become a backup destination candidate from the searched records.

The backup management module 110 that had obtained location information of the DC enabled to become the backup destination candidate at S2050, proceeds to one of the processes S2070 to S2100 according to the details of the backup type information 3020 obtained at above GUI 3000 (S2060).

When the backup type information 3020 obtained at above GUI 3000 designates "difference backup" (S2060: difference backup), the backup management module 110 determines whether the DC location where the reference resource specified in above S2010 to S2030, that is, where the backup source data exists matches the location of the corresponding DC that is enabled to be the backup destination candidate specified in S2050 (S2070). As a result of this determination, the backup management module 110 advances the process to S2120 when the two match (S2110: YES). Besides determining whether the location of the DCs of the backup source and the backup destination match, the backup management module 110 can use a method of comparing the ID of the reference resource with the IDs of the backup destination DCs and using the backup destination candidate when the IDs match each other.

In S2120, the backup management module 110 calculates all the line paths from the DCs that are the reference resources, that is, the backup source resources to the target DC 122C of the corresponding service ID that has been set the backup destination candidate determined in S2070, and stores the calculated path information into the backup candidate table 125.

Specifically, the backup destination candidate specifies the target DC 122C, in the service management table 122, in which a virtual resource is created when the service of the corresponding service ID is used. Subsequently, the backup management module 110 specifies, from among the records in the network management table 123, the record where the value of the connection 123B corresponds to the set of the DC of the backup source corresponding to the above reference source and the corresponding DC of the backup destination candidate specified in S2050, and extracts the NWID 123A value from the record. Further the backup management module 110 using an appropriate algorithm attaches a plan ID to the NWID 123A value extracted here to add the plan ID to the backup candidate table 125. When there is a plurality of the extracted NWID 123A values, the backup management module 110 sets a plan ID to each of values to add the plan ID to the backup candidate table 125.

In a case where a single service ID can assign any plurality of the DCs, all the DCIDs that may be assigned are listed as the target DC 125C values, and all the NWIDs that may be the path candidate to the above DCs that may be assigned are listed as the path 125D values. And the values are not set to the cost 125E, the time 125F and the priority 125G columns of the corresponding record in the backup candidate table 125 when the above addition to the table is performed since the values according to the calculation performed later are set.

The backup management module 110 performs the above processes and proceeds to S2130 for determining the next service ID.

On the other hand, when the DCs are different from each other as a result of the above determination in S2070 (S2110: NO), the backup management module 110 determines that the service ID in the present process is not a candidate and proceeds to determine the next service ID in the service management table 122 (S2130 to S2040). This is because the difference data of the "difference backup" would not be of use when there is no base data to be the origin.

Meanwhile, when the backup type information 3020 obtained at above GUI 3000 designates "full backup (high-availability)" (S2060: full backup: (high-availability))), the backup management module 110 determines whether the DC location where the reference resource specified in above S2010 to S2030, that is, the backup source data differs from the location of the corresponding DC that is enabled to be the backup destination candidate specified in S2050 (S2080).

When determining difference in locations, for the DCs of the backup source and the backup destination, the spots of the GPS or the area data indicated by the values of the disclosed location 121C and the non-disclosed location 121D are determined to differ when the two have no common part, that is, the corresponding DC is used as the backup destination candidate, and the corresponding DC is exempt from being a candidate when there is any common part between the GPS spots or the area data. This idea is based on the purpose of excluding a chance of being affected by a physical failure or an external factor (e.g., a power failure and the like) when the reference (i.e., backup source) resource and the backup destination resource are placed in a close or the same place. Note that, for such reasons, selections of "place in different power supply areas" or "place in areas of different communication networks" may be provided to the user in the GUI 3000 as a selection of a backup type same as the "full backup (high-availability)", and a user's selection is received.

As a result of the above determination, the backup management module 110 proceeds the process to S2120 when the DCs are different from each other (S2110: YES). In this S2120, the backup management module 110 calculates all the line paths from the DC of the reference resource being the backup source resource, to the target DC 122C of the corresponding service ID set as the backup destination candidate by the determination in S2080 and stores the calculated path information in the backup candidate table 125.

Meanwhile, when the information 3020 of the backup type obtained in above GUI 3000 designates "full backup (DR)" (S2060: full backup (DR)), the backup management module 110 determines whether the location of the DC in which data of the reference resource specified in above S2010 to S2030, that is, the backup source exists, and the location of the corresponding DC that is enabled to become the backup destination candidate specified in S2050 are separated by a predetermined distance (e.g., 100 km or greater) or more (S2100).

In this case, the backup management module 110 estimates area data of a predetermined region that is distant by a predetermined distance from the GPS point data corresponding to the location (disclosed location 121C or non-disclosed location 121D) of the DC of the reference resource, that is, the backup source, or the border of the area data. The backup management module 110 uses the corresponding DC as the backup destination when there is no common part between the area data of the predetermined range and the area data of the location of the DC that is enabled to be a backup destination candidate, and exempt from being a candidate when there is any common part. The backup management module 110 may be configured to make a determination by adding a condition of, in addition to the above determination, the locations of the DCs at the backup destination and the backup source that belong to different power supply areas and the like.

When as a result of the above determination the DCs are distant by a predetermined distance or more (S2110: YES), the backup management module 110 proceeds to the process S2120. In this S2120, the backup management module 110 calculates all the line paths from the DC being the reference resource, that is the backup source resource, to the target DC 122C of the corresponding service ID set as the backup destination candidate by the determination in S2080 and stores the calculated path information in the backup candidate table 125.

Meanwhile, when the information 3020 of the backup type obtained in above GUI 3000 designates "full backup (normal)" (S2060: full backup (normal)), the backup management module 110 uniformly uses the service IDs currently under process as the backup destination candidate (S2100), and thereafter goes through S2110 to S2130 and returns the process to S2040.

Note that, when there is a common part between the "full backup (high-availability)" and the "full backup (DR)", a process of using either one as the candidate and alarming the user at S4000 when selected by the user and the like, can be employed.

The backup management module 110 appropriately performs each of the above processes in S2070 to S2100 and when completing S2130, that is, when completing the processes on all the service IDs in the service management table 122, successively performs the processes in S3000. And when the backup candidate table 125 is empty after the above processes are performed, the backup management module 110 may be configured to display on the output device 106 or the terminal 4 to notify the user that there is no backup destination candidate that can be selected.

Next, a detailed description of the process S2000 in the flow diagram illustrated in FIG. 11 will be given. FIG. 13 is a diagram illustrating the third process flow example of the backup management method in the first embodiment. In this case, the backup management module 110 calculates the values to be set in each of the fields of the cost 125E and the time 125F in the backup candidate table 125 created in above S2120 and the like, and updates the backup candidate table 125 using the calculation results (S3010). The value of cost 125E here is calculated using the following calculation formula.

Cost (size 124*E* of the reference resource to be the backup source, assumed use time)=size 124*E* of DC corresponding to reference resource×(usage fee 123*F* specified from NWID corresponding to the network used during backup)+(assumed use time×usage fee 122*D* specified from the service ID corresponding to the service used during backup)

And the time 125F is calculated using the following calculation formula.

> Time(size 124E of the reference resource to be the backup source)=size 124E of the reference resource to be the backup source/communication speed 123D specified from the NWID corresponding to the network used during backup Note that, for both the cost 125E and the time 125F, the actual use amount (i.e., data amount) of the reference resource to be the backup source or the data amount that is actually backed up when the "backup type" is a "difference backup", may be applied to the above calculation instead of size 124E.

And when the assumed use time is not designated by the user when calculating the above cost 125E, a default value (e.g., 30 days) or a user designated value when such value is designated (description is given later on the method of the user manually inputting the value) is set. And when the service is of a sellout (only the initial cost is incurred) the cost at the time of the sellout is to be added to the cost calculated above.

Further when calculating the time 125F, the backup management module 110 may add a condition of "equal to or more than" to the calculated value of the time 125F since a possibility of the value of the time 125F worsening, that is, increasing cannot be removed when the value of the communication quality 123E (see network management table 123) specified by NWID corresponding to the network used during backup is "volatile".

Further in the service management table 122, when the lead time as the value of the time from the contract of the service until time when the service becomes available is to be retained, the backup management module 110 may add this lead time to the above calculation result of the time 125F.

And as has been explained in connection with above S2120, when a plurality of DCs may be assigned to a single service ID, the backup management module 110 can calculate the cost and time for using the DCs and paths and set the cost 125E to "equal to or more than (minimum cost)" and the time 125F to "equal to more than (minimum time)" using, for example, the minimum value among them.

When continuous backup is assumed, the backup management module 110 can retain the past average data transfer amount in the corresponding resource (e.g., data transfer amount for a single month) in the storage device 101, memory 103 and the like and calculate the above value of the "size 124E of the reference resource of the backup source" using "average transfer amount×assumed use time" described above.

Subsequently, the backup management module 110 determines the information in the option 3030 obtained in above GUI 3000 (S3020) and advances the process to S3030 when the user designated option is "place priority on cost" (S3020: YES). On the other hand the process is moved to S3040 when the user designated option is "place priority on time" (S3020: NO). Note that when there are options existing other than the above in relation with the option 3030 at GUI 3000, the options are added accordingly to the branches of the process in S3020.

Next in S3030, in other words, in the determination of the above S3020, the backup management module 110 sorts the records, that is, the plans in the backup candidate table 125 in the order of the value of the cost 125E and sets priority 125G in ascending order of cost 125E in the process when the user designated option is "set priority on cost". This priority 125G sets a higher priority for a smaller value of the cost 125E (for example, "1" is the value set the highest priority for the value of priority 125G, and the priority is lowered as the value increases). Note that, when plans with the same values exist in the cost 125E, the backup management module 110 randomly selects one of the plans and sets the plan a higher priority than the other record.

Meanwhile in S3040, that is, in the determination of the above S3020, the backup management module 110 sorts the records, that is, the plans in the backup candidate table 125 in the order of the value of the time 125F and sets priority 125G in ascending order of time 125F in the process when the user designated option is "set priority on time". This priority 125G sets a higher priority for a smaller value of the time 125F (for example, "1" is the value set the highest priority for the value priority 125G, and the priority lowers as the value increases). Note that, when plans with the same values exist in the time 125F, the backup management module 110 randomly selects one of the plans and sets the plan a higher priority than the other plan. Further, the backup management module 110 can perform a process of, such as, reading the value of the path 125D from the records, that is, the plans in the backup candidate table 125, acquiring the value of the communication quality 123E from the network management table 123 based on the value of the path 125D, determining that there is a possibility that the process time would increase to a time that is equal to or longer than the backup time calculated in above S3000 for the plan in which the value of this communication quality 123E takes "volatile", and reducing the priority of the plan compared to other plans.

Subsequently, the backup management module 110 determines whether plans with the same evaluation values (values of cost 125E in the case of "place priority on cost" and time 125F in the case of "place priority on backup time") exist in the backup candidate table 125, and when plans with the same evaluation values exist as a result of the determination, further determines whether the values (those searched in the cloud data center management table 121) of the non-disclosed information 121D corresponding to the values of the target DC 125C include a mixture of "-(Unknown)" and others, in the plans.

As a result of the determination in above S3050, the backup management module 110 advances the process to S3060 when the above mixture is recognized (S3050: YES) with regard to the value of the non-disclosed information 121D corresponding to the value of the target DC 125C. And on the other hand the backup management module 110 advances the process to S4000 when the above mixture is not recognized (S3050: NO) with regard to the value of the non-disclosed information 121D corresponding to the value of the target DC 125C.

In S3060, the backup management module 110 sets the priority 125G of the plan whose non-disclosed information 121D is known to be higher than the priority 125G of the non-disclosed information 121D that is "-(Unknown)", in the plans having the same evaluation values and those recognized to include the above mixture of the values to the non-disclosed information 121D corresponding to the target DC 125C, in the above determination. After performing the process in S3060 for the plans whose non-disclosed information 121D is known among the plans recognized the above mixture, the backup management module 110 advances the process to S4000. Note that, the backup management module 110 may be configured to perform the processes of the above S3050 and S3060 concurrently during the process of S3030 or S3040.

Second Embodiment

Different from a conventional non cloud system having all the resources controlled by the user, the services that are provided and their characteristics change over time in a cloud regardless of whether the user desires such or not. The system configuration (network management table 123 and the like) described in the first embodiment is an example of such. In addition, the elements (e.g., security and reliability as the user evaluations on the cloud) of a non-system configuration may also change. For such reason, a backup destination that matches the requirements desired by the user may be presented by considering the changes. Description of such technique will be given in the second embodiment.

Firstly, an example of the cloud evaluation table 127 having stored therein evaluation values of the clouds and DCs calculated mainly based on qualitative evaluation and the like as the information additionally used by the backup management module 110 is shown in the second embodiment. FIG. 17 is a diagram illustrating a data configuration example of a cloud evaluation table 127 in the second embodiment. This cloud evaluation table 127 is stored in, for example, the internal management information 120 of the management server 100.

This cloud evaluation table 127 is a collection of records including the values of the cloud name 127A and DCID 127B, and the various evaluation view points and the evaluation values 127C for each viewpoint. Among these, the viewpoint 127C may have set an evaluation value (e.g., record 127D) in units of DCs when the location (information of the non-disclosed location 121D) of the DC is known such as in the case of its own cloud or a partner cloud, and an evaluation value (e.g., record 127E) in units of clouds when the location of the DC is not known such as in the case of a cloud of another company.

The security 127F, the availability 127G and the reliability 127H of the corresponding cloud are given as examples of the items in the viewpoint 127C of the cloud evaluation table 127, and in addition to the above, the risk of information leakage based on the performance or the law of an overseas country, the value of an external assessment result, the stability of power of the DC providing the cloud and the like are assumed, but other items may be used. The evaluation values of the clouds relating to these items may be values set by the cloud operator itself or a value lead from a value of an external evaluation organization. Further, the items in the viewpoint 127C may be periodically reviewed using an external factor and updated.

The items in the viewpoint 127C may use values that have integrated a plurality of further fragmented viewpoints. For example, the security 127F may be an evaluation value that is obtained by normalizing the sum of a plurality of evaluation values of items such as the number of security certifications, assessment of security made by an outsider, and the like.

Items of cost and backup time are included in the viewpoint 127C for the sake of convenience but they may be omitted. Further, the values of the items in viewpoint 127C are normalized values between "0" and "1" as exemplified in FIG. 17, but the values need not be normalized values.

Figure 18:
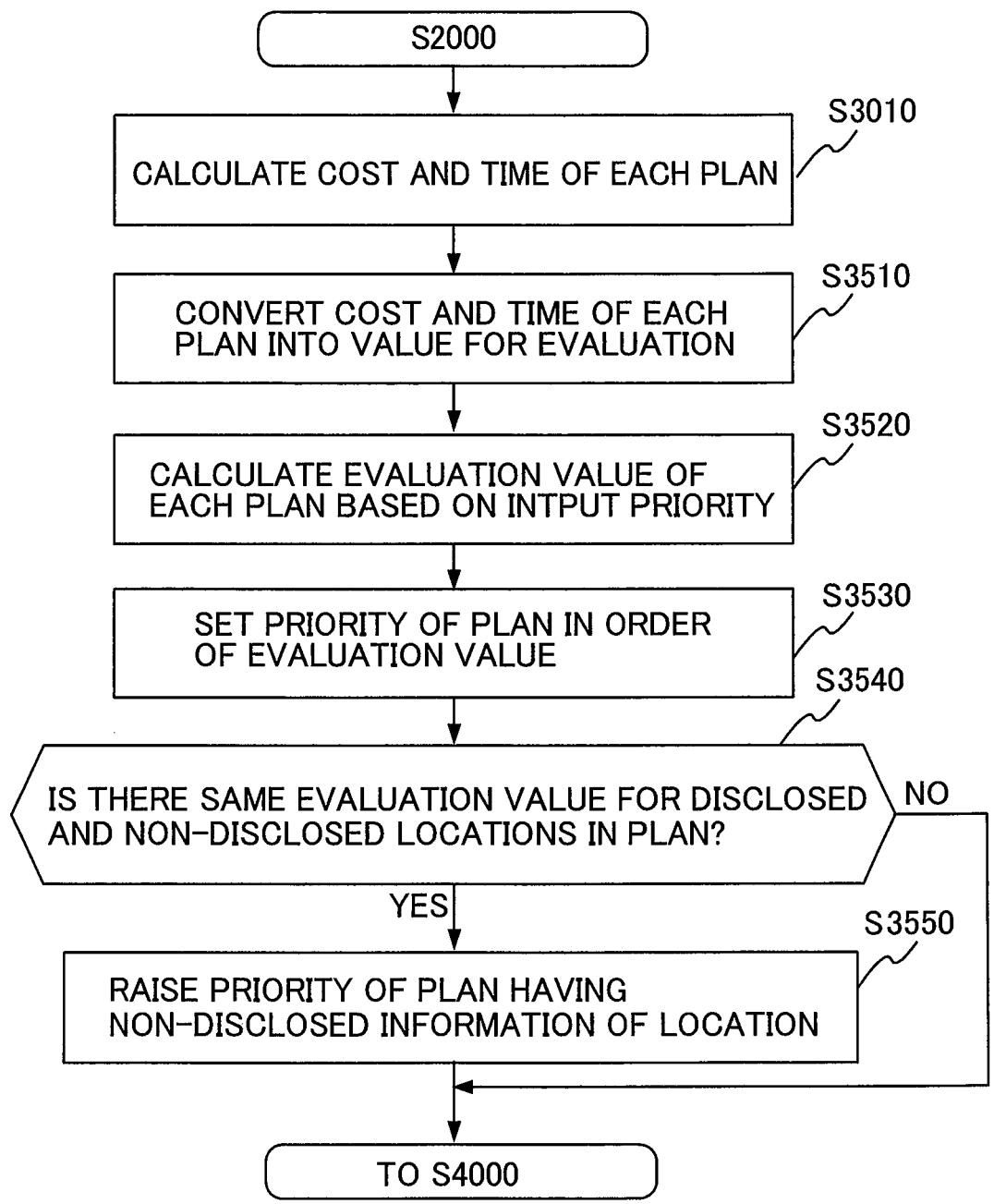
FIG. 18 is a flowchart illustrating an example of a process of a backup management method in the second embodiment.

Description of the process flow of the backup management module 110 in the second embodiment will be given next. FIG. 18 is a flowchart illustrating an example of a process of a backup management method in the second embodiment. The process flow in the second embodiment is basically the same as the process flow in the first embodiment (FIG. 11) but the input items at S1000 and the process of S3000 is different from the first embodiment. Thus description of such differences will be mainly given in the following.

The backup management module 110 in this case displays on the GUI, as items received from a user input at S1000, the items of the viewpoint 127C of the cloud evaluation table 127 instead of option 3030 on the GUI 3000 in the first embodiment.

Figure 19:
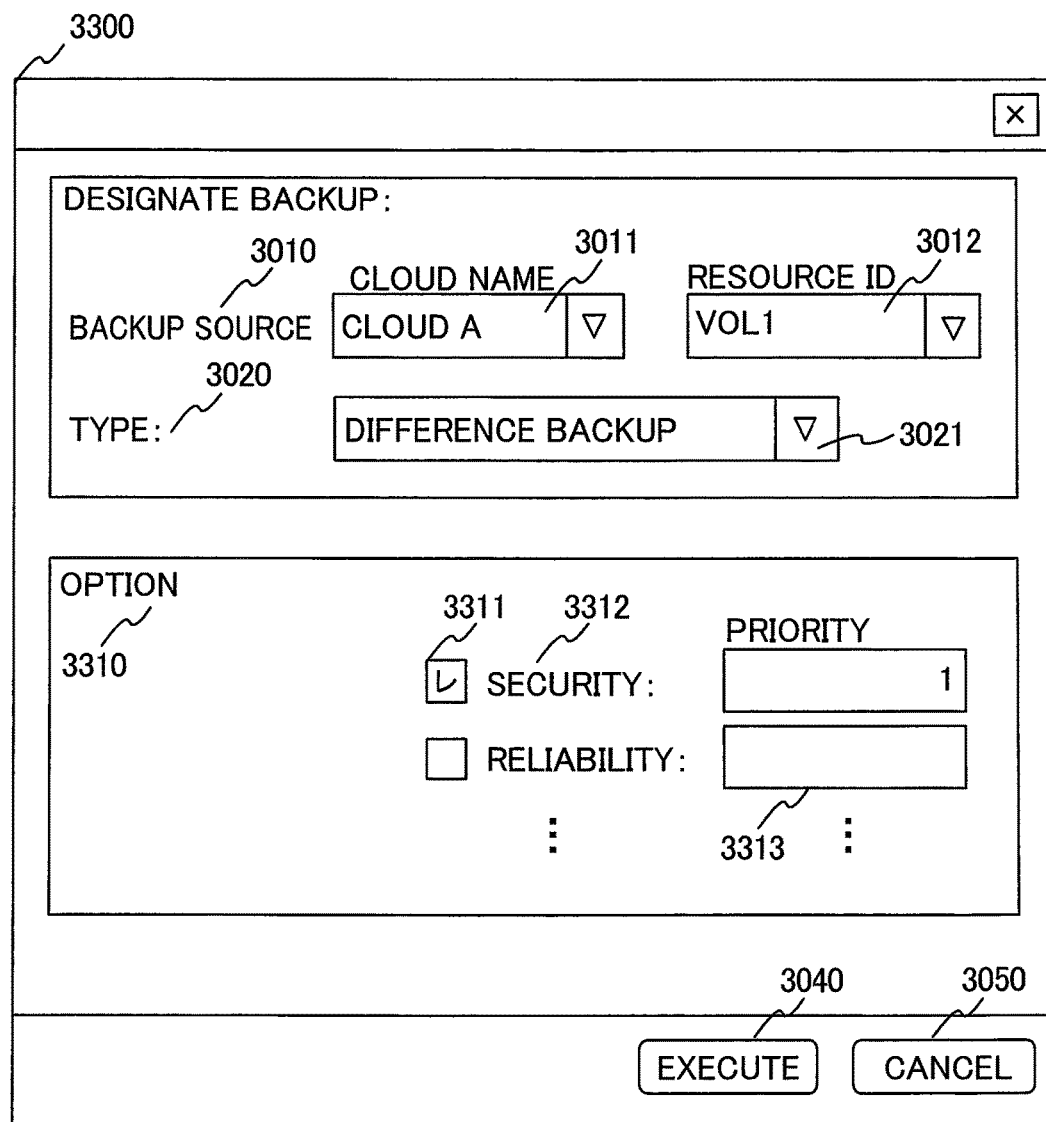
FIG. 19 is a diagram illustrating an example of an input GUI in the second embodiment.

The image of this GUI is exemplified in FIG. 19. FIG. 19 is a diagram illustrating an example of an input GUI in the second embodiment. The configuration of the option field 3310 in the GUI image 3300 shown here is different from the option 3030 in the first embodiment. The option field 3310 in the GUI 3300 of the second embodiment is a type configured of an item name field 3312 that indicates the item names of the viewpoint 127C in the cloud evaluation table 127, the interface 3311 (e.g., a checkbox) for selecting whether or not the corresponding item in this item name field 3312 is to be considered, and the priority input field 3313 for inputting the priority relating to the corresponding items in the item name field 3312. The backup management module 110 can display on the output device 106 or the terminal 4 the GUI 3300 having such interface configuration, receive the designation of items that the user requests to consider and the priorities set thereto, and perform the predetermined process (later described S3520) based on the priority. Note that, the output interface of the result displayed at above S4000 may be the same for the second embodiment and the first embodiment, but the evaluation value calculated at S3520 to be described later may be output therewith in the second embodiment.

The backup management module 110 is configured to evaluate the backup destination based on the user input at such GUI 3300. As the process of S3010, the backup management module 110 firstly calculates the cost 125E and the time 125F for each plan in the backup candidate table 125 and sets the calculated values in the record of the corresponding plan in the backup candidate table 125, similar to the first embodiment.

Subsequently, the backup management module 110 converts to values for evaluation the cost 125E and the time 125F values of the plans calculated in the above process S3010 (S3510). For this conversion process there may be used, for example, a process of normalizing values that are "1" or less by dividing each of the values of the cost 125E and the time 125F of each plan by the maximum value of the respective plan.

Then the backup management module 110 uses the cost 125E and the time 125F values normalized in above S3510 and the cloud evaluation table 127 to calculate the evaluation values for each plan (S3520). There is a method of, multiplying a predetermined weight value corresponding to the value of the priority 3313 input by the user at the GUI 3300, by the evaluation value of the item selected by the user at the GUI 3300 among the viewpoints 127C, for each plan, and setting the sum of the evaluation values as the evaluation value of the corresponding plan, as an example of the calculation method.

For example, it is assumed that a circumstance at the GUI 3300 where the items designated by the user at the interface 3311 are "security" and "reliability", the input value, that is, the priority at the priority input field 3313 relating to "security" is "1", and similarly the priority relating to "reliability" is "2". And at this time, it is also assumed that a relation of C1>C2 when the weight value of the "security" corresponding to the priority is "C1" and similarly the weight value of "reliability" is "C2".

In this case, the calculation process of the evaluation value for, for example, "plan 1" in the backup candidate table 125 of the backup candidate table 125 exemplified in FIG. 9 is as follows. Here, since the value of the target DC 125C (i.e., resource of the backup destination) in the backup candidate table 125 is "DC2", the backup management module 110 reads the records relating to "DC2" in the cloud evaluation table 127 and calculates; evaluation value=C1× 1.0 (security)+C2×0.8 (reliability) using the values of the security 127F and the reliability 127H included in the record.

Note that, the above weight values (C1, C2 etc.) corresponding to the priorities may be predetermined values or values designated by the user that the management server 100 has received at the input device 105 or the terminal 4.

Further, an example where the evaluation was performed using the cloud evaluation table 127 storing the evaluation values relating to the clouds and the DCs was shown in the above description. However, the management server may be configured to further retain in the storage device 101 evaluation values (e.g., performance etc.) for each service ID and consider while including also this evaluation value in the calculation element of the above evaluation value.

Subsequent to the above S3520, the backup management module 110 sorts the records, that is, the plans in the backup candidate table 125 based on the evaluation values of the plans calculated in above S3520, attaches priorities in descending order starting with the plan with the highest evaluation value as a result of the sorting, and updates the priority 125G in the backup candidate table 125 using the priority values (S3530). When the plans with the same evaluation value exist, the backup management module 110 may select one of the plans using a predetermined algorithm and set thereto a priority higher than the other plan.

Subsequently the backup management module 110, similar to S3050 and others in the process flow of the first embodiment, determines whether both plans having the same evaluation values that have the non-disclosed location 121D (i.e., the operator of the corresponding DC is the owner company or a partner cloud), and those that do not have the non-disclosed location 121D (cloud of a different company) exist (S3540).

When determined to include the both (S3540: YES) as a result of the determination, the backup management module 110 updates the backup candidate table 125 such that the priority 125G value of the plan whose evaluation value is the same and the non-disclosed location 121D is known to be higher than the plan whose evaluation value is the same but the non-disclosed location 121D is unknown (S3550). Note that, plans with the same evaluation value were subject of the process in above S3540, but S3550 may be performed for plans having evaluation values that are within a predetermined range.

Then backup management module 110 is to perform the process of S4000 and those that follow using the backup candidate table 125 that has gone through the above processes.

Third Embodiment

Examples for determining the location of the DC that is to be the backup destination according to the backup type and the desired requirements of the user had been shown up to the second embodiment. Meanwhile, there may be a case where the user desires to designate a district wider than the disclosed location 121C or the non-disclosed location 121D that are where the DCs are located in actual use. As an example, there is a case where the user desires to designate a country as the backup destination in order to circumvent drawbacks suffered due to the laws of the country where the backup target data exist. Similarly, there may be a case where a country or a district is designated due to reasons of taxes or business development by the user and the like.

Thus in the third embodiment, description will be given of a type that allows to receive from the user designation of a place at a granularity that does not specify the location of the DC that is non-disclosed. Firstly, an example is given of an GUI that receives designation relating to the DC location of the backup destination at such granularity.

Figure 20:
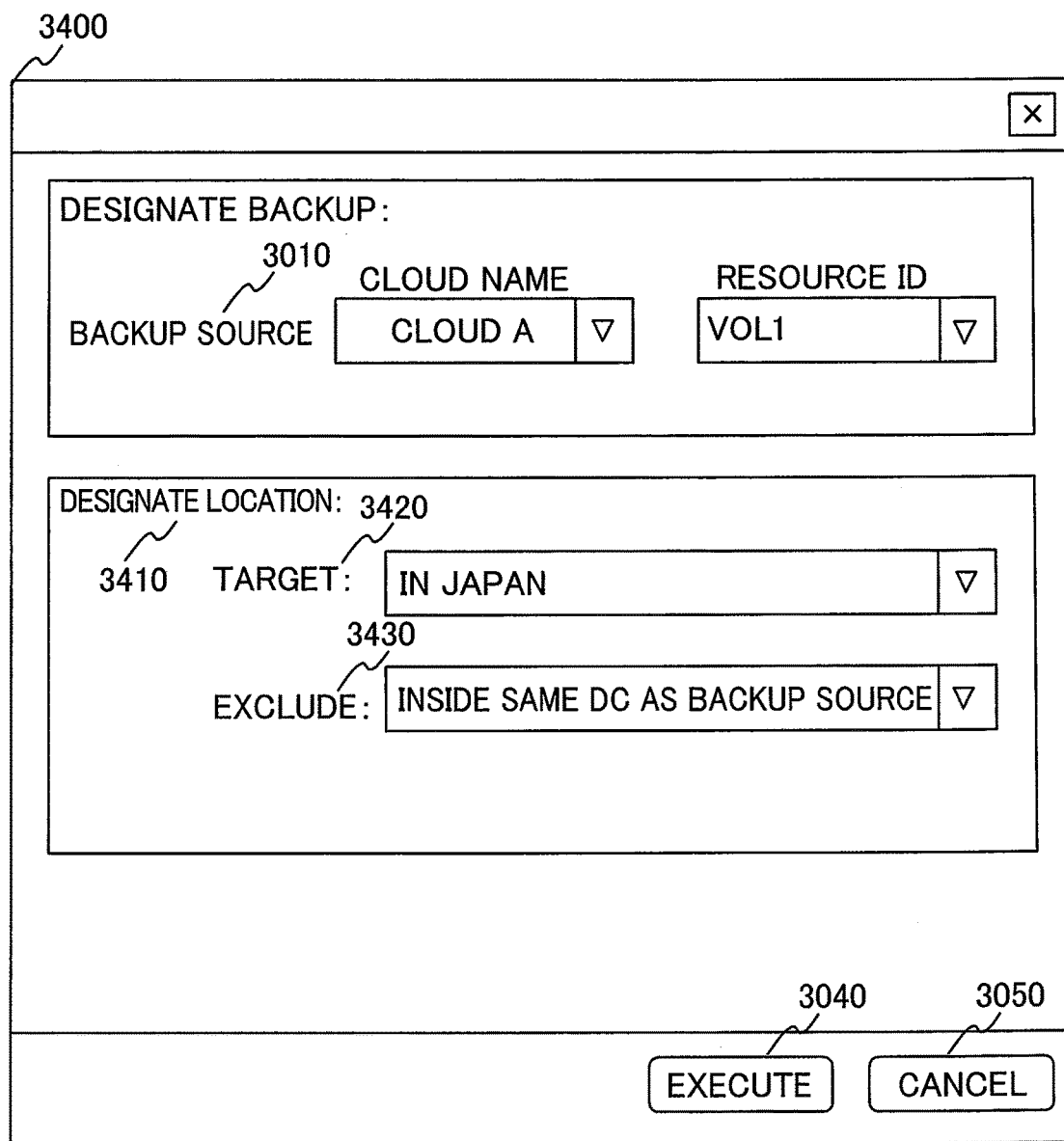
FIG. 20 is a diagram illustrating an example of an input GUI in the third embodiment.

FIG. 20 is a diagram illustrating an example of an input GUI in the third embodiment. The GUI image 3400 as the input GUI exemplified in FIG. 20 includes an interface of the designate location 3410 instead of select type 3020 and option 3030 and the like included in the GUI in the first embodiment. As the interface in this designate location 3410 there are included the target selection 3420 (e.g., pull-down menu) being the interface that receives the user designation relating the target area, and the exclude selection 3430 (e.g., pull-down menu) being the interface that receives the designation of the excluded area in the target range designated by the target selection 3420.

Such selections shown by the target selection 3420 and the exclude selection 3430 may be values (e.g., by country) designated in advance or may be information based on the disclosed location 121C or those extracting only effective selections taking into consideration disclosed location 121C from the above value designated in advance.

Figure 21:
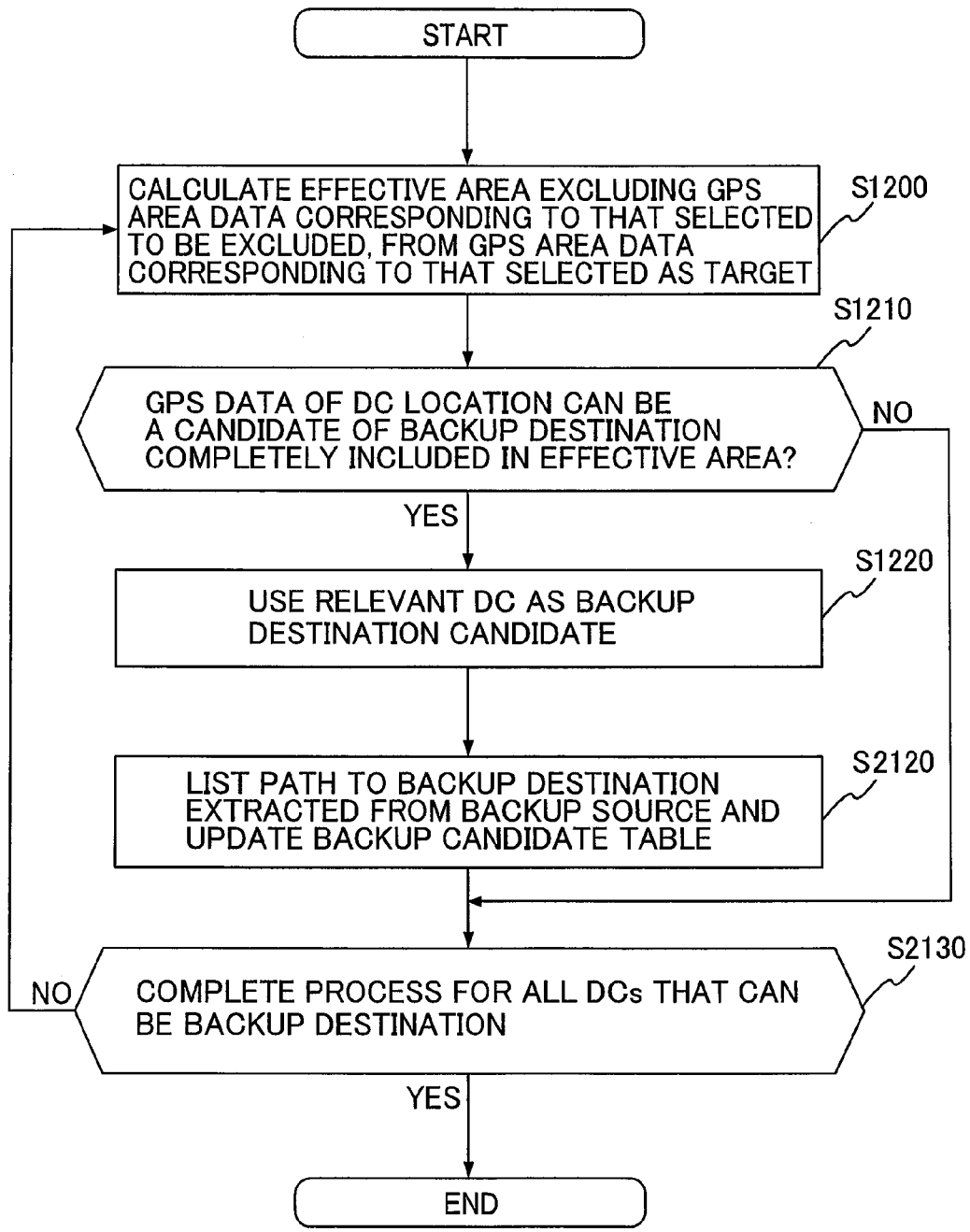
FIG. 21 is a flowchart illustrating an example of a process of a backup management method in the third embodiment.

The following processes are performed as the process for backup destination selection in the third embodiment instead of the processes performed in S2060 to S2100 in the process flow of the first embodiment. FIG. 21 is a flowchart illustrating an example of a process of a backup management method in the third embodiment In this case, the backup management module 110 calculates the region (hereinafter effective area) excluding the GPS area data corresponding to the user input at exclude selection 3430, using the GPS range data corresponding to the user input at the target selection 3420 (S1200). The backup management module 110 retains in advance GPS area data corresponding to the user inputs of target selection 3420 and exclude selection 3430 in the storage device 101 for this process.

Then the backup management module 110 determines whether the GPS data of the DC location that is enabled to be the backup destination candidate determined at S2050 exemplified in the process flow in FIG. 12, is completely included in the above effective area (S1210). As a result of this determination, when it is determined that the GPS data of the DC location enabled to become the backup destination candidate is completely included in the effective area (S1210: YES), the backup management module 110 specifies the DC to be the backup destination candidate and performs the same process as S2120 in the process flow of FIG. 12 and advances the process to S2130.

On the other hand, when it is determined that the GPS data of the DC location enabled to become the backup destination candidate is partially included (i.e., a part is in the effective area and the others are outside the effective area) in the effective area (S1210: NO) as a result of the above determination, the backup management module 110 does not make this DC a candidate (S1230) and advances the process to S2130. Note that the DC that is not made a candidate in this S1230 may be made a candidate on purpose to perform the process in S1220 and display an alarm notification on the output device 106 or the terminal 4 when selected by the user in the process of S4000 that is performed later.

After this, the backup management module 110 repeatedly performs the above processes until all the processes for the DCs that are enabled to become backup destination candidates determined in S2050 are completed (S2130: NO to S1200).

Note that the backup management module 110 may perform the processes corresponding to the backup type selection 3020 and the like exemplified in GUI 3000 in the first embodiment and the like, in addition to the processes based on information of the target selection 3420, exclude selection 3430 etc. obtained at GUI 3400 exemplified in FIG. 20. Additionally, the backup management module 110 can be configured to perform the process using the above processes of S1200 to S1210 to check whether the backup source and the backup destination are in an appropriate position relation using the value of the resource ID or the service ID related to the backup destination candidate as the input.

Fourth Embodiment

As described above, there is a plurality of types of clouds such as the IaaS, the PaaS, the SaaS and the like. An example where the data of the SaaS and the PaaS are backed up to the IaaS is shown in the fourth embodiment. Note that, although description in the following is given for the SaaS, this embodiment can be similarly applied to the PaaS and the like.

Figure 22:
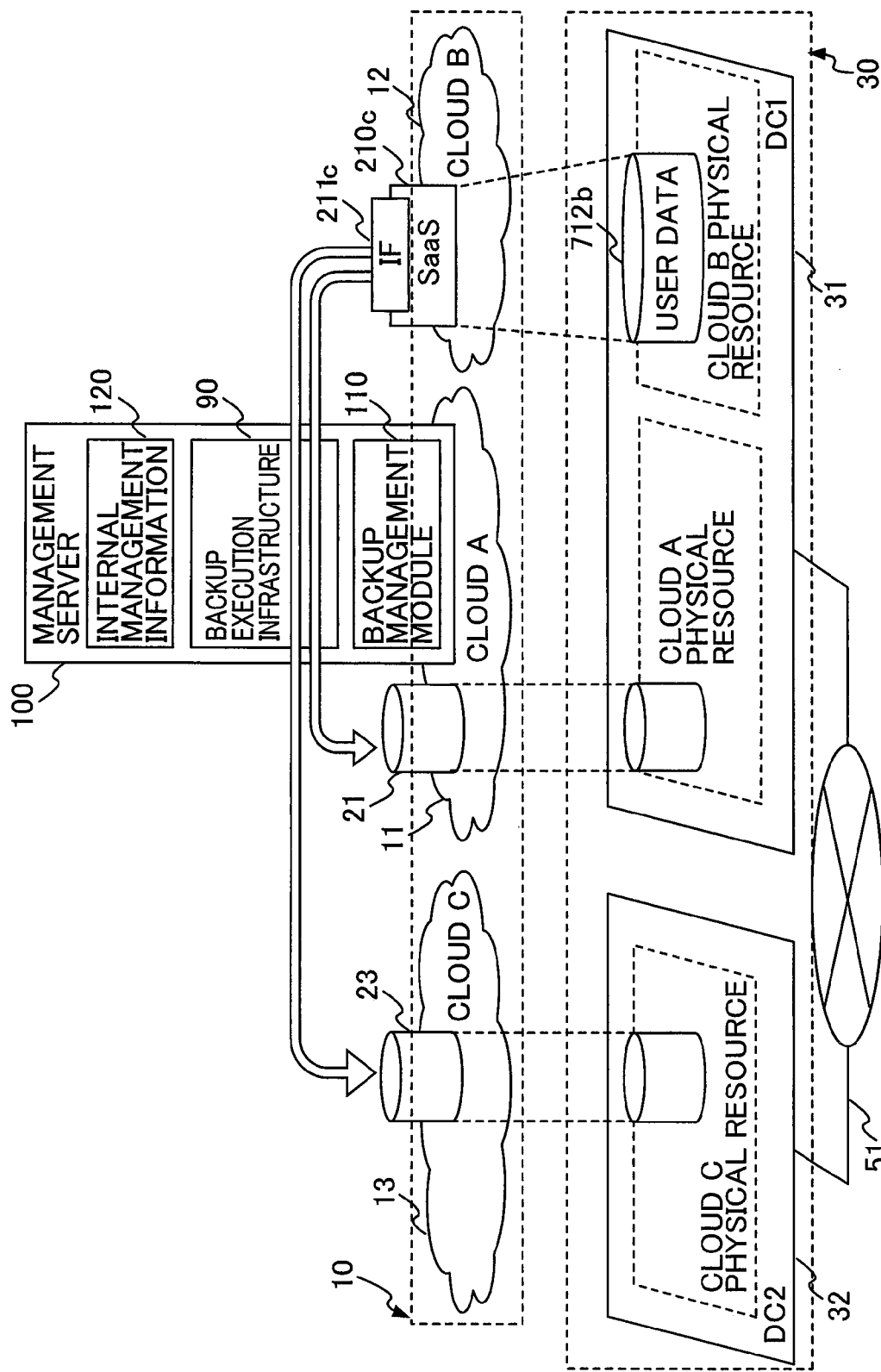
FIG. 22 is a network configuration diagram including the backup management system in the fourth embodiment.

FIG. 22 is a network configuration diagram including the management server 100 being the backup management system of the fourth embodiment. A case is assumed where the user data 712b included in the SaaS 210c provided by the cloud 12 is backed up to a different cloud. Here, the backup management module 110 of the management server 100 retains as the resource ID 124A of the resource management table 124 an identifier (e.g., user ID 124D) for specifying the corresponding user data 712b, and the position specifying information or the area specifying information corresponding to the location where the user data 712b indicated by the identifier is stored.

Figure 23:
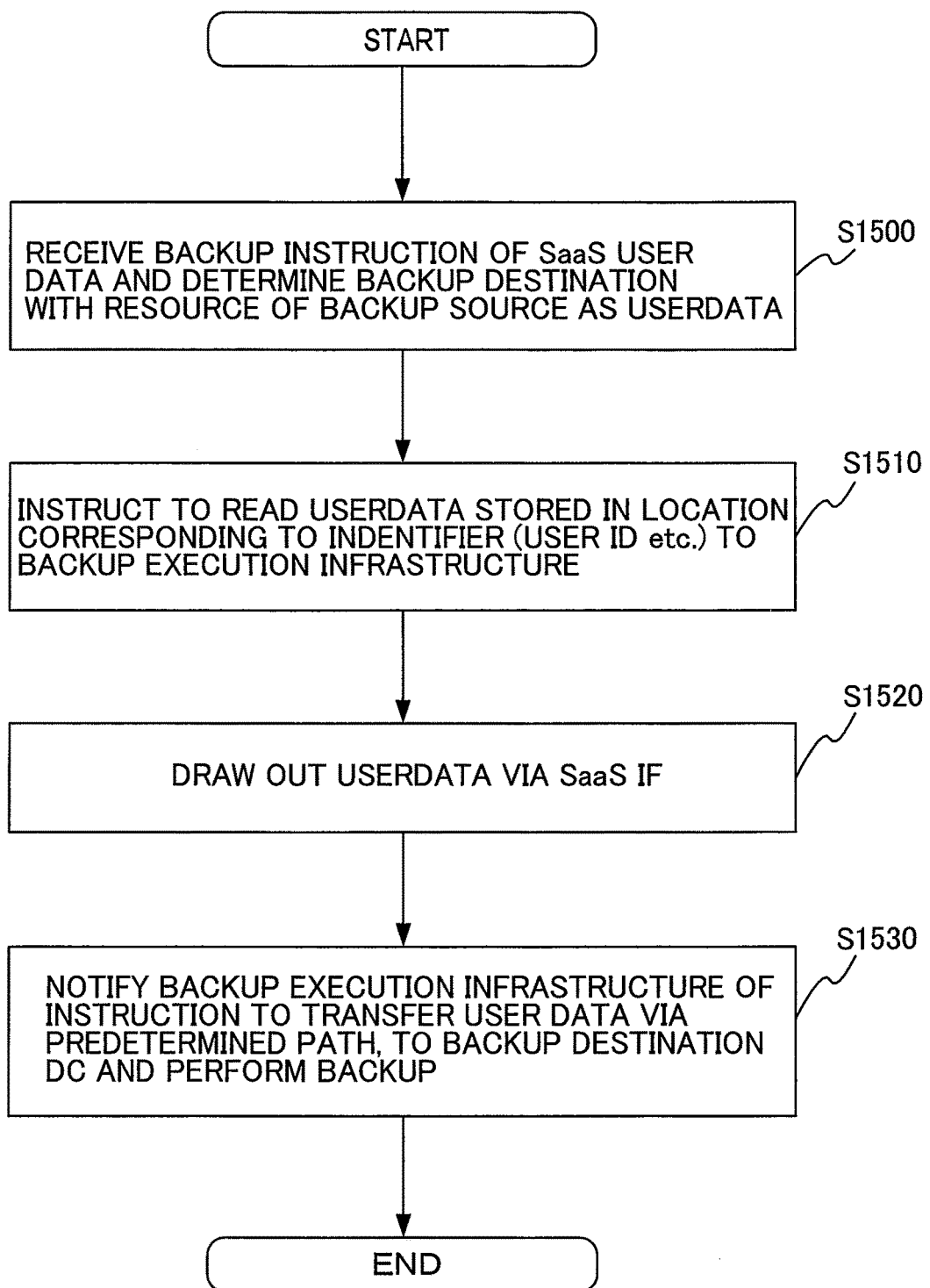
FIG. 23 is a flowchart illustrating an example of a process of a backup management method in the fourth embodiment.

FIG. 23 is a flowchart illustrating an example of a process of a backup management method in the fourth embodiment. Upon reception of an instruction to backup the user data 712b of the SaaS 210c from the above server S1000 and the like, the backup management module 110 of the management server 100 is to perform, similar to the aforementioned embodiments, the backup destination determination process based on the location relation between the DCs of the backup source and the backup destination and various user requirements and the like, using the resource of the backup source as the user data 712b (S1500).

The backup management module 110 that has determined the backup destination instructs to the backup execution infrastructure 90 to read out the corresponding user data, that is, user data stored in the location indicating the corresponding position specifying information or the corresponding area specification information corresponding to the above identifier (user ID etc.) (S1510) and draws the user data 712b through the IF 211c of the SaaS (S1520).

Additionally, the backup management module 110 is configured to notify to the above backup execution infrastructure 90 an instruction to transfer the drawn user data 712b through a predetermined path (considering the communication cost, time and etc.) to the determined backup destination DC (S1530), and perform a backup process. Note that, API can be assumed as an example of the IF 211c.

Although the best mode for carrying out the invention has been specifically described hereinabove, the present invention is not to be limited thereto and can be altered in various ways without departing from the scope of the present invention.

According to the present embodiments, a backup according to the cloud user's requirements is enabled without disclosing to the cloud user non-disclosed information of a cloud operator.

At least the following will become apparent from the description in the present specification. In other words, in a backup management system, when a plurality of computer resources that have the position relation satisfying the backup requirement are specified in the process of specifying the backup destination, the processing device may evaluate each of the plurality of the specified computer resources based on a predetermined criteria of at least one of information retained in the storage device in advance, information received from the communication device or the input device, and information obtained from any one of the above processes, and specify as the backup destination a computer resource having a highest result in the evaluation.

According to the above, a further suitable computer resource can be promptly and effectively specified even in a circumstance where multiple computer resources are desirable as backup destinations, with regard to position relation of the computer resources as the backup targets.

Further, in the backup management system, when there is a plurality of computer resources with the same evaluation result in the evaluation, the processing device may further correct the evaluation result of the computer resource storing the position specifying information in the location management table to be higher than the evaluation result of the computer resource not storing the position specifying information, and specify as the backup destination a computer resource having a highest result after the correction in the evaluation.

According to the above, a computer resource that is adapted to also a circumstance where a plurality of backup destinations are specified by also the above evaluation, and that accurately matches the requirements and the like desired by the user can be specified as the backup destination.

Further, in the backup management system, the storage device may further retain, for the each cloud service, a cost information table storing therein information on usage cost incurred for a usage of the each cloud service and a communication cost when performing data communication between the each cloud service, and the processing device may evaluate, in the evaluation, each of the plurality of the specified computer resources based on a predetermined criteria of at least any one of information on the usage cost in the cost information table and the communication cost incurred for communicating with the computer resource as the backup target, and specify as the backup destination a computer resource having a highest result in the evaluation.

According to the above, a further suitable computer resource, in relation to cost, can be promptly and effectively specified even in a circumstance where multiple computer resources are desirable as backup destinations, with regard to position relation of the computer resources as the backup targets.

Further, in the backup management system, the storage device may further retain for the each cloud service an evaluation parameter in relation to one or more predetermined items and updates the evaluation parameter according to an update instruction from an external device, and the processing device may evaluate, in the evaluation, each of the plurality of the specified computer resources based on a predetermined criteria of an evaluation parameter of the item designated by the user and the cost information corresponding thereto, among the predetermined item, the usage cost and the communication cost, and specify as the backup destination a computer resource having a highest result in the evaluation.

According to the above, among the items that may vary with time such as user evaluation (e.g., reliability, security and etc.) relating to the cloud service, evaluating those designated by the user together with the above cost allows to specify the preferable backup destination from the plurality of backup destinations and thereby a preferable backup destination in relation to the events, including cost, focused by the user can be further accurately specified.

Further, in the backup management system, the storage device may further retain a communication quality information table storing therein quality information on a communication line used for data communication between the each cloud service, and the processing device, in relation to the plurality of the specified computer resources, may read from the communication quality information table the quality information on the communication line between the computer resource of the backup target, evaluate, in the evaluation, based on a predetermined criteria of a backup time based on the corresponding quality information, and specify as the backup destination a computer resource having a highest result in the evaluation.

According to the above, a further suitable computer resource, in relation to such as the time required for backup process that fluctuates according to the communication quality between the cloud services, can be promptly and effectively specified even in a circumstance where multiple computer resources are desirable as backup destinations, with regard to position relation of the computer resources as the backup targets.

Further, in the backup management system, the storage device may further retain for the each cloud service an evaluation parameter in relation to one or more predetermined items and updates the evaluation parameter according to an update instruction from an external device, and the processing device may evaluate, in the evaluation, each of the plurality of the specified computer resources based on a predetermined criteria of a backup time based on the quality information and the evaluation parameter of the corresponding item designated by the user among the predetermined items, and specify as the backup destination a computer resource having a highest result in the evaluation.

According to the above, among the items that may vary with time such as user evaluation (e.g., reliability, security and etc.) relating to the cloud service, evaluating those designated by the user together with the above communication quality allows to specify the preferable backup destination from the plurality of backup destinations thereby a preferable backup destination in relation to the events, including cost, focused by the user can be further accurately specified.

Further, in the backup management system, the processing device may receive through the communication device or the input device a location designation condition that specifies the location provided by the computer resource in a granularity different from that of the position specifying information and the area specifying information, as the backup requirement, and check with the location designation condition the position specifying information or the area specifying information of the computer resource specified as the backup destination in the backup destination specifying process, and specify the corresponding computer resource as the backup destination when the check result satisfies the location designation condition.

According to the above, the position of the backup destination can be flexibly narrowed down such as restricting to overseas, restricting to domestic regions, or restricting to the same building, and thus a backup destination that matches in a further accurate manner to the requirements desired by the user can be effectively specified.

Further, in the backup management system, the processing device may further perform a backup process by transferring data from the backup target computer resource to the computer resource of the specified backup destination, and a process of outputting through the output device or the communication device each information of the backup destination and the backup target, and a progress information on the backup process.

According to the above, an actual backup process can be performed for a backup destination that matches the requirements desired by the user.

Further, when wherein the cloud service that provides the computer resource of the backup target has an interface that outputs user data that the user uses in the cloud service, with a user identifier as an input, in the backup management system, the storage device may retain in the location management table a position specifying information or an area specifying information corresponding to a location where the user data is stored, as the position specifying information or the area specifying information of the computer resource in the cloud service, and the processing device may extract the user data stored in a location indicated by the corresponding position specifying information or the area specifying information, using the user identifier as an input from the interface of the backup target computer resource, and transfer the extracted user data to the computer resource of the backup destination.

According to the above, when the cloud service is configured in an environment with a Platform as a Service (PaaS), a Software as a Service (SaaS) and the like, a backup process through the interface (e.g., API) can be performed so that an actual backup process to the backup destination that matches the requirements desired by the user can be effectively performed in various environments.

What is claimed is:

1. A backup management system connected over a network to a plurality of cloud services with a plurality of virtual storage resources provided by a plurality of physical resources located in a plurality of data centers, the backup management system comprising:
a processor;
a storage device, connected to the processor, that stores a location management table including at least one of position specifying information specifying a plurality of respective locations of the data centers providing the physical resources in each of the cloud services and area specifying information specifying a plurality of respective predetermined areas of the data centers providing the physical resources in each of the cloud services without specifying the locations thereof; and
a memory, connected to the processor, which stores instructions that, when executed by the processor, causes the processor to:

receive a backup request designating a first virtual resource among the virtual resources of a first cloud service among the cloud services as a backup target and one or more backup requirements thereof, execute a process for extracting one or more of the cloud services as one or more backup destination candidates based on position relationships of the data centers to the first cloud service designated by the backup request, execute a process for setting a priority order of the backup destination candidates based on the backup requirements designated by the backup request, receive a backup execution instruction designating a second cloud service from the priority order of the backup destination candidates, and execute a backup of the first virtual resource from the first cloud service to the physical resources of the second cloud service designated by the backup execution instruction, wherein the process for extracting the one or more of the cloud services as the one or more backup destination candidates is based on the position relationships of the data centers to the first cloud service designated by the backup request which exceed a distance threshold value.

2. The backup management system according to claim 1, wherein the priority order is set according to a plurality of costs associated with backing up the first virtual resource from the first cloud service to the physical resources of each of the backup destination candidates.

3. The backup management system according to claim 1, wherein
the storage device further stores a cost information table storing therein information on a plurality of costs including usage costs incurred for a usage of each of the cloud services and a plurality of communication costs when transferring data the each of the cloud services, and wherein the priority order is set according to the costs associated with backing up the first virtual resource from the first cloud service to the physical resources of each of the backup destination candidates.

4. The backup management system according to claim 3, wherein the backup request designates that the priority order be set according to the costs as one of the backup requirements.

5. The backup management system according to claim 1, wherein the priority order is set according to a plurality of times associated with backing up the first virtual resource from the first cloud service to the physical resources of each of the backup destination candidates.

6. The backup management system according to claim 5, wherein the storage device further stores a communication quality information table storing therein quality information on a plurality of communication mediums used for data communication between the cloud services, and wherein the priority order is set according to the times associated with backing up the first virtual resource from the first cloud service to the physical resources of each of the backup destination candidates using the communication mediums of the communication quality information table.

7. The backup management system according to claim 6, wherein the backup request designates that the priority order be set according to the times as one of the backup requirements.

8. The backup management system according to claim 1, wherein the backup requirements designate a target location of the backup destination candidates and exclude any of the cloud services which are located in the same one of the data centers as the first cloud service.

9. A backup management method for a backup management system connected over a network to a plurality of cloud services with a plurality of virtual storage resources provided by a plurality of physical resources located in a plurality of data centers, the backup management method comprising:

storing a location management table including at least one of position specifying information specifying a plurality of respective locations of the data centers providing the physical resources in each of the cloud services and area specifying information specifying a plurality of respective predetermined areas of the data centers providing the physical resources in each of the cloud services without specifying the locations thereof;

receive a backup request designating a first virtual resource among the virtual resources of a first cloud service among the cloud services as a backup target and one or more backup requirements thereof, execute a process for extracting one or more of the cloud services as one or more backup destination candidates based on position relationships of the data centers to the first cloud service designated by the backup request, execute a process for setting a priority order of the backup destination candidates based on the backup requirements designated by the backup request, receive a backup execution instruction designating a second cloud service from the priority order of the backup destination candidates, and execute a backup of the first virtual resource from the first cloud service to the physical resources of the second cloud service designated by the backup execution instruction, wherein the process for extracting the one or more of the cloud services as the one or more backup destination candidates is based on the position relationships of the data centers to the first cloud service designated by the backup request which exceed a distance threshold value.

* * * * *